US011629316B2

(12) United States Patent
Lee et al.

(10) Patent No.: US 11,629,316 B2
(45) Date of Patent: Apr. 18, 2023

(54) BEVERAGE MAKER

(71) Applicant: LG ELECTRONICS INC., Seoul (KR)

(72) Inventors: Daewoong Lee, Seoul (KR); Yongbum Kim, Seoul (KR); Jinpyo Hong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 676 days.

(21) Appl. No.: 16/614,849

(22) PCT Filed: May 17, 2018

(86) PCT No.: PCT/KR2018/005679
§ 371 (c)(1),
(2) Date: Nov. 19, 2019

(87) PCT Pub. No.: WO2018/216957
PCT Pub. Date: Nov. 29, 2018

(65) Prior Publication Data
US 2020/0208084 A1    Jul. 2, 2020

(30) Foreign Application Priority Data

May 22, 2017  (KR) .................. 10-2017-0063155
May 30, 2017  (KR) .................. 10-2017-0067036

(51) Int. Cl.
*C12C 13/10*     (2006.01)
*F25B 1/00*      (2006.01)
(Continued)

(52) U.S. Cl.
CPC .............. *C12C 13/10* (2013.01); *B67D 1/004* (2013.01); *C12C 11/06* (2013.01); *C12C 13/00* (2013.01);
(Continued)

(58) Field of Classification Search
CPC ....... B67D 1/004; C12C 11/006; C12C 13/00; C12C 13/02; C12C 13/10
See application file for complete search history.

(56) References Cited

U.S. PATENT DOCUMENTS

| 2010/0112166 A1 | 5/2010 | Levin |
| 2014/0013958 A1 | 1/2014 | Krasne et al. |

(Continued)

FOREIGN PATENT DOCUMENTS

| CN | 106247756 | 12/2016 |
| JP | 2001-192094 | 7/2001 |

(Continued)

OTHER PUBLICATIONS

Korean Office Action dated Aug. 10, 2020 issued in KR Application No. 10-2017-0067036.

(Continued)

*Primary Examiner* — Henry T Crenshaw
(74) *Attorney, Agent, or Firm* — Ked & Associates, LLP

(57) ABSTRACT

A beverage maker according to an embodiment of the present disclosure may comprise: a base; a fermentation module which comprises a fermenter module having an opening part, and a fermentation lid for opening and closing the opening part, and which is disposed on the upper side of the base; a passage module connected to the fermentation module and comprising at least one passage and at least one valve; and a main frame disposed on the upper side of the base and having at least a part of the passage module mounted thereto.

11 Claims, 12 Drawing Sheets

(51) Int. Cl.
  *F25B 49/02* (2006.01)
  *B67D 1/00* (2006.01)
  *C12C 13/00* (2006.01)
  *C12C 11/06* (2006.01)
  *C12C 13/02* (2006.01)

(52) U.S. Cl.
  CPC ............... *C12C 13/02* (2013.01); *F25B 1/00* (2013.01); *F25B 49/02* (2013.01)

(56) References Cited

U.S. PATENT DOCUMENTS

| | | | |
|---|---|---|---|
| 2014/0017354 A1* | 1/2014 | Joseph | C12C 7/04 99/278 |
| 2014/0234482 A1* | 8/2014 | Kempfert | C12C 13/10 99/278 |
| 2016/0326471 A1* | 11/2016 | Aown | C12C 11/00 |
| 2018/0100693 A1 | 4/2018 | Qiu et al. | |

FOREIGN PATENT DOCUMENTS

| | | |
|---|---|---|
| KR | 20-0264651 | 2/2002 |
| KR | 20-0319526 | 7/2003 |
| KR | 10-2005-0108089 | 11/2005 |
| KR | 10-2007-0022929 | 2/2007 |
| KR | 10-0813648 | 3/2008 |
| KR | 10-2009-0000946 | 1/2009 |
| KR | 10-2010-0063879 | 6/2010 |
| KR | 20-2011-0011527 | 12/2011 |
| KR | 10-2013-0036897 | 4/2013 |
| KR | 10-1549073 | 9/2015 |
| WO | WO 2008/104971 | 9/2008 |

OTHER PUBLICATIONS

Korean Office Action dated Aug. 27, 2020 issued in KR Application No. 10-2017-0063155.
International Search Report dated Feb. 8, 2019 issued in Application No. PCT/KR2018/005679.
Korean Office Action dated Apr. 16, 2020.
European Search Report dated Mar. 9, 2021.

* cited by examiner

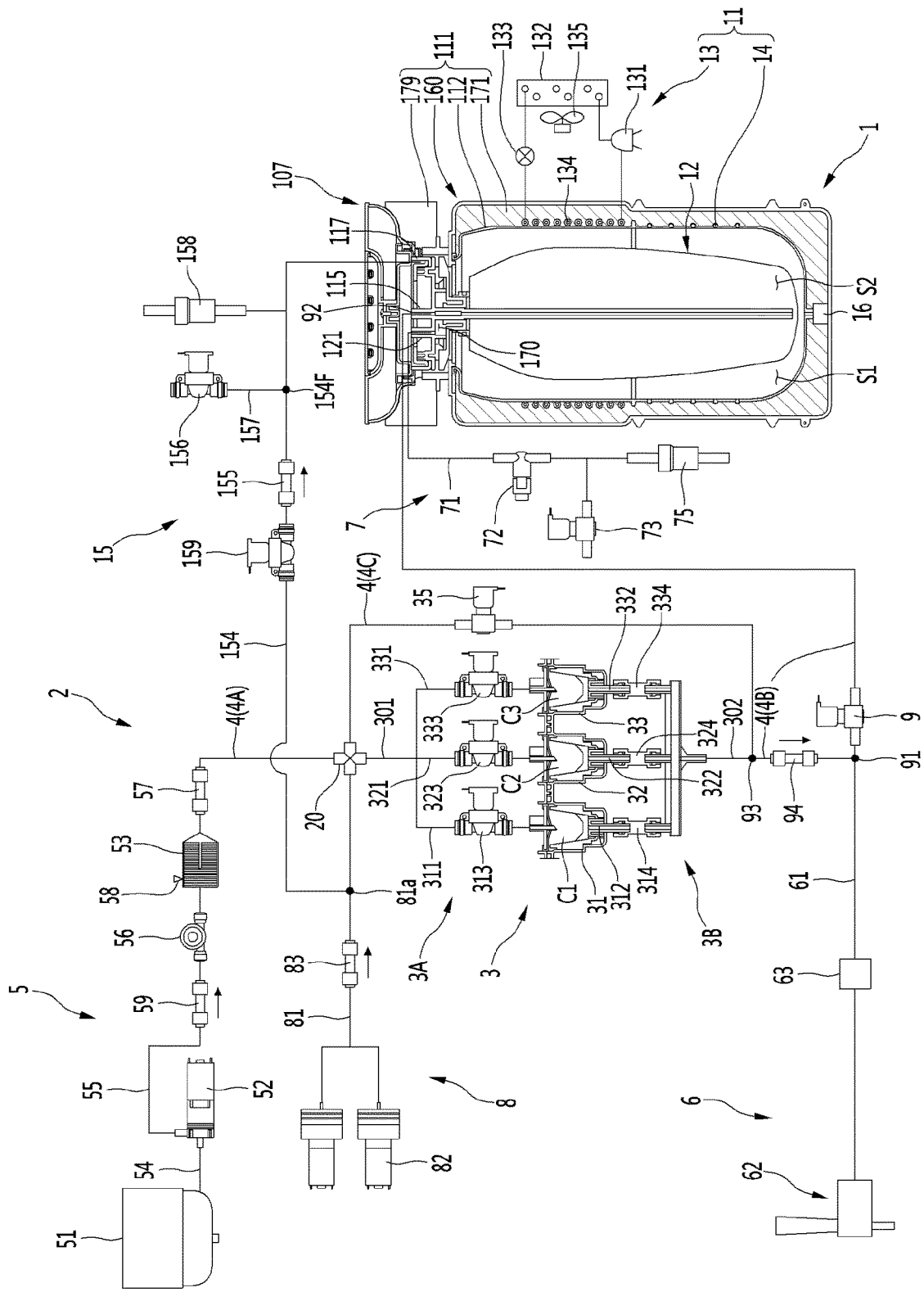
[FIG. 1]

[FIG. 2]
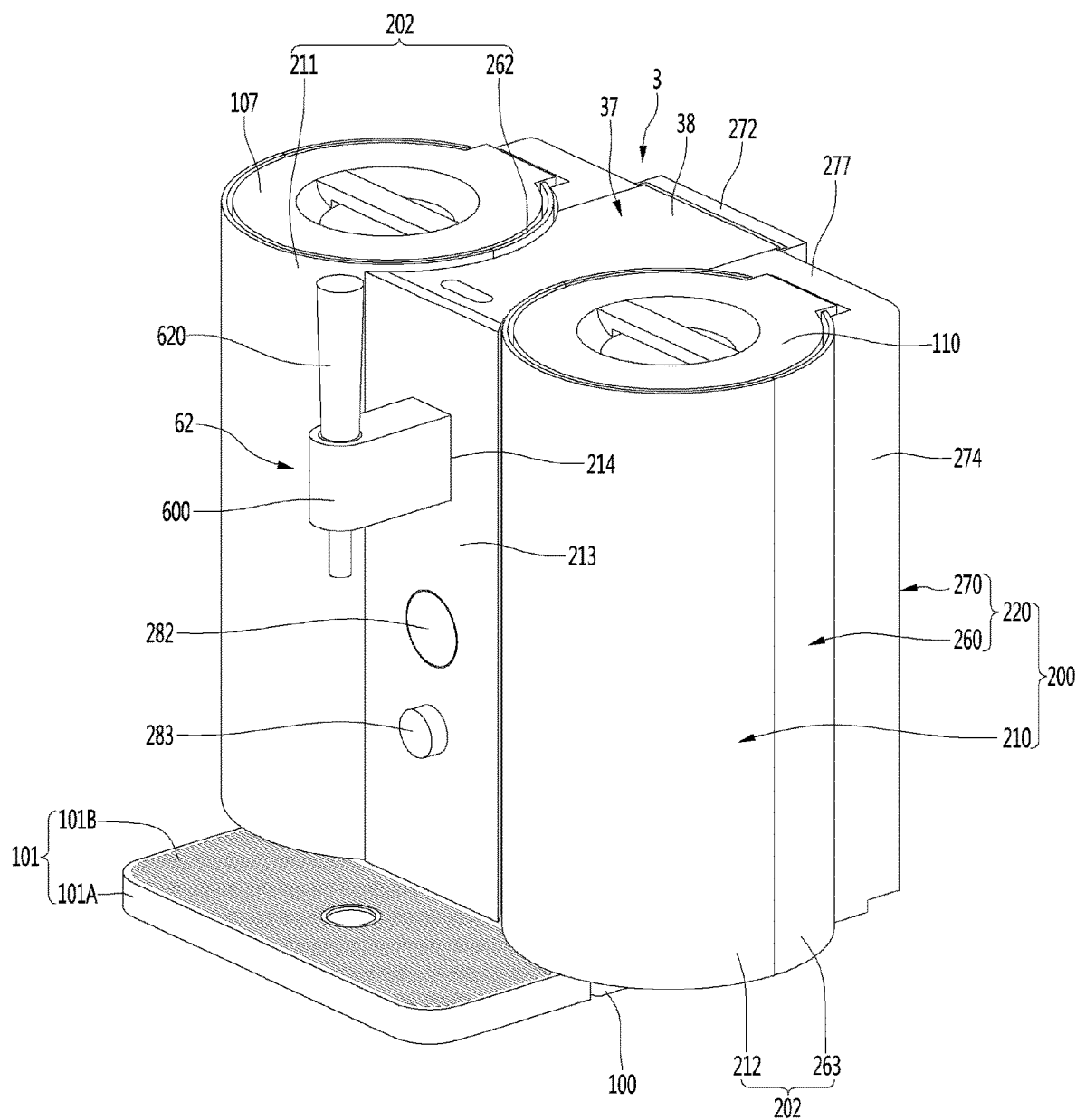

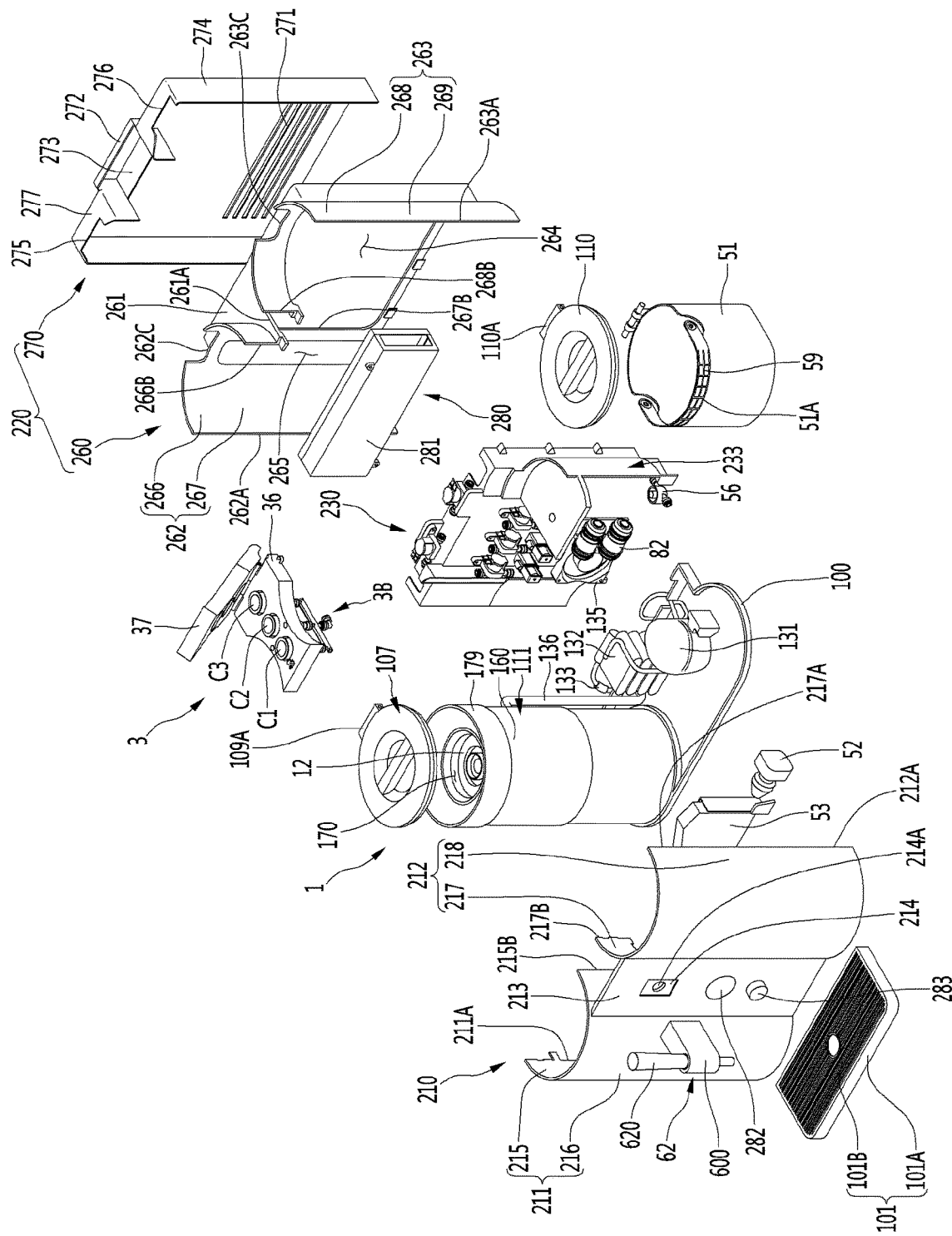
[FIG. 3]

[FIG. 4]
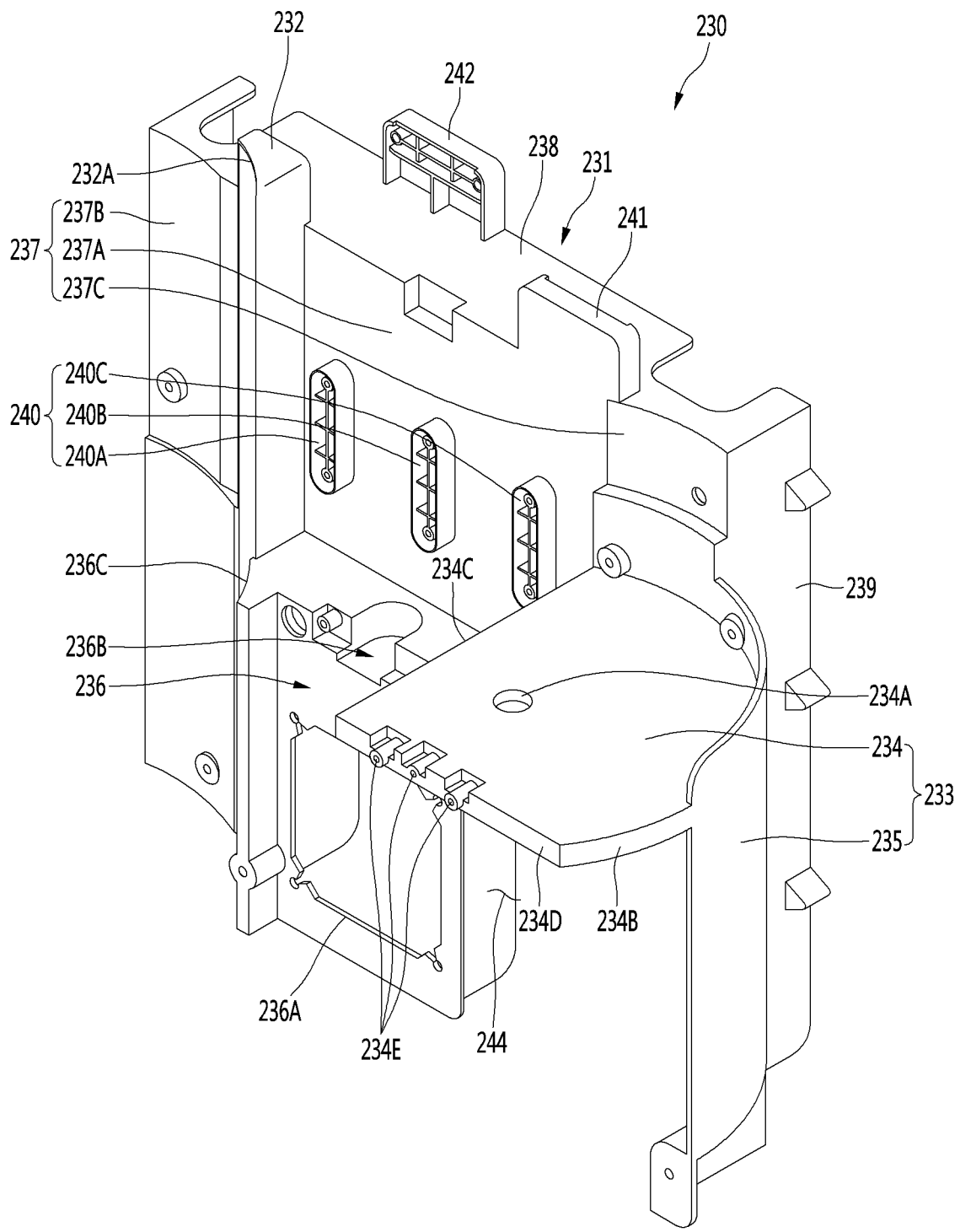

[FIG. 5]
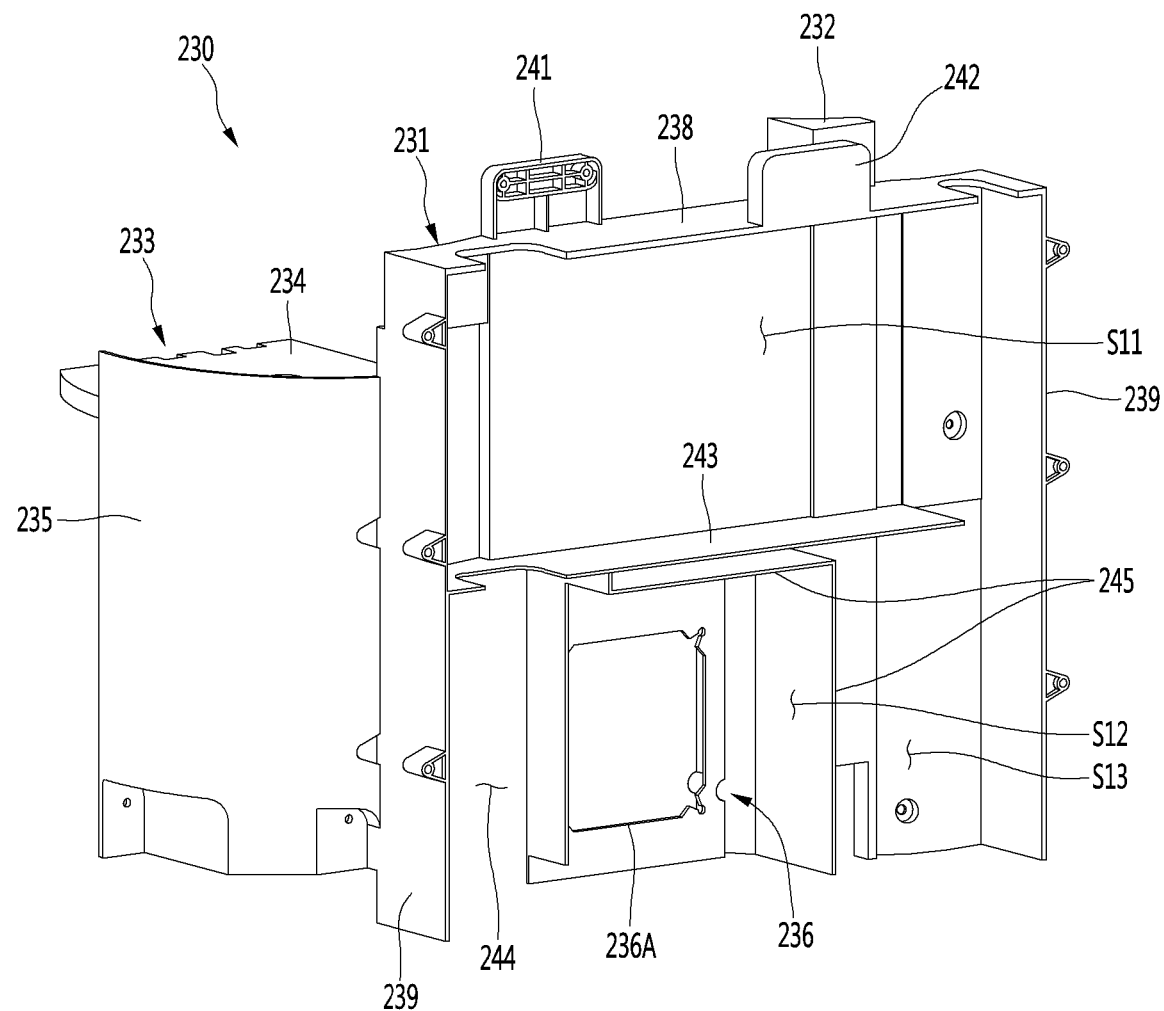

[FIG. 6]
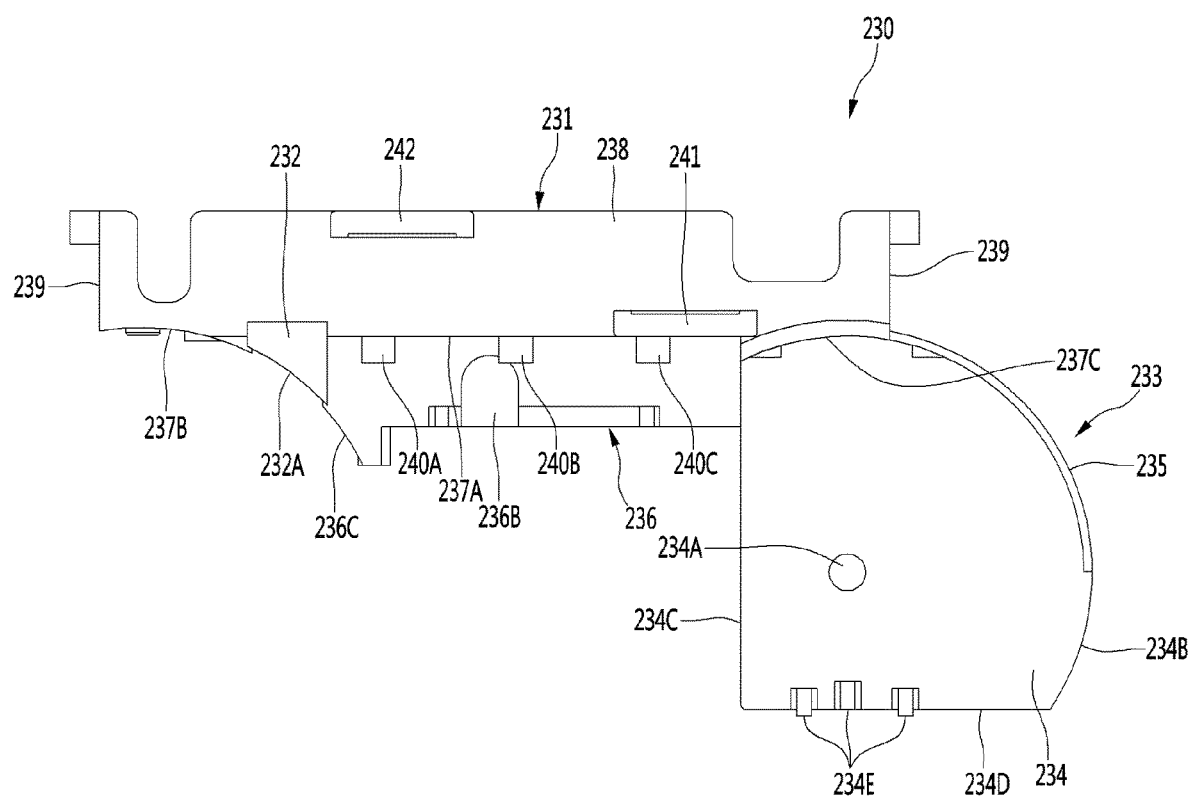

[FIG. 7]
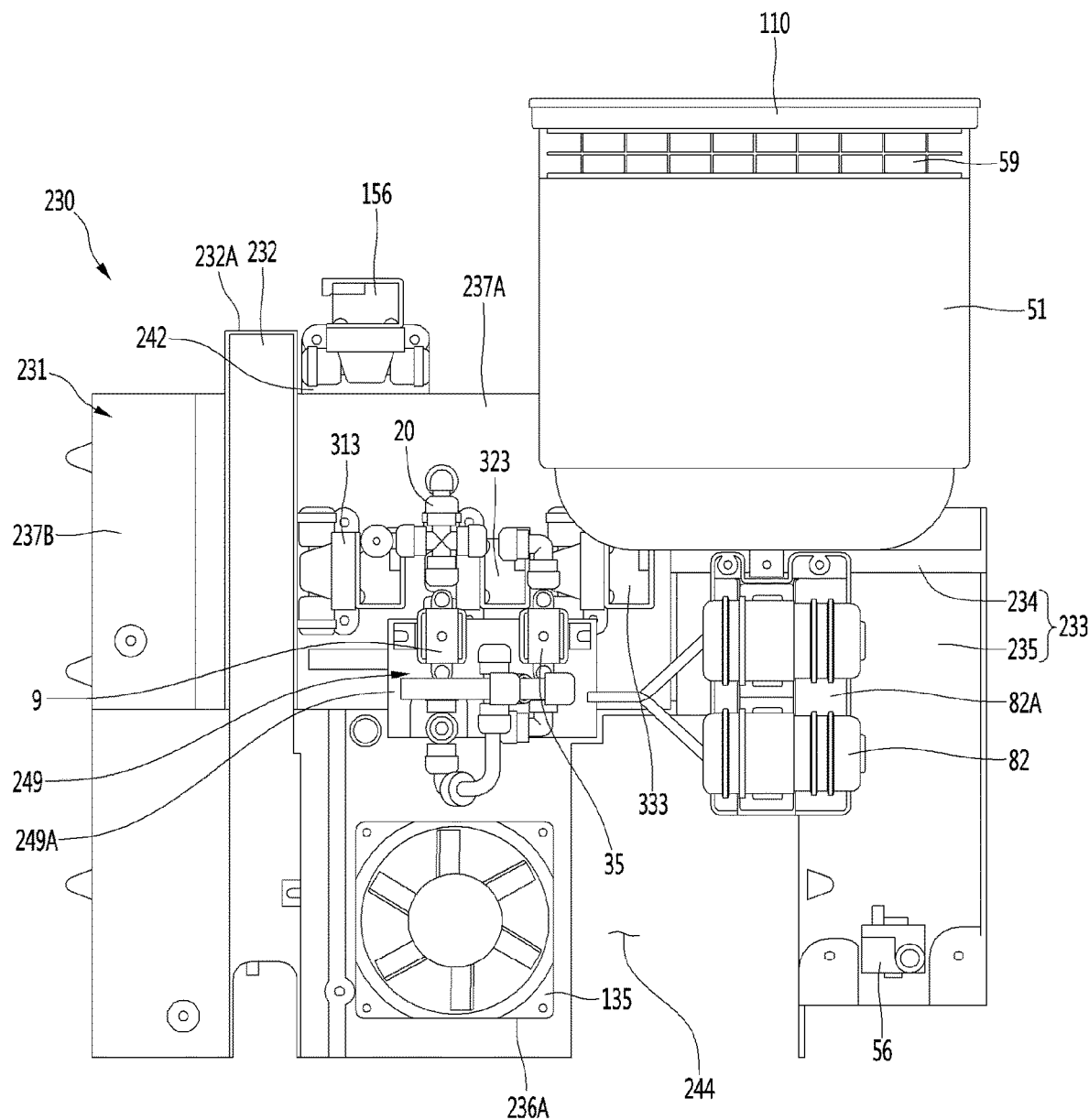

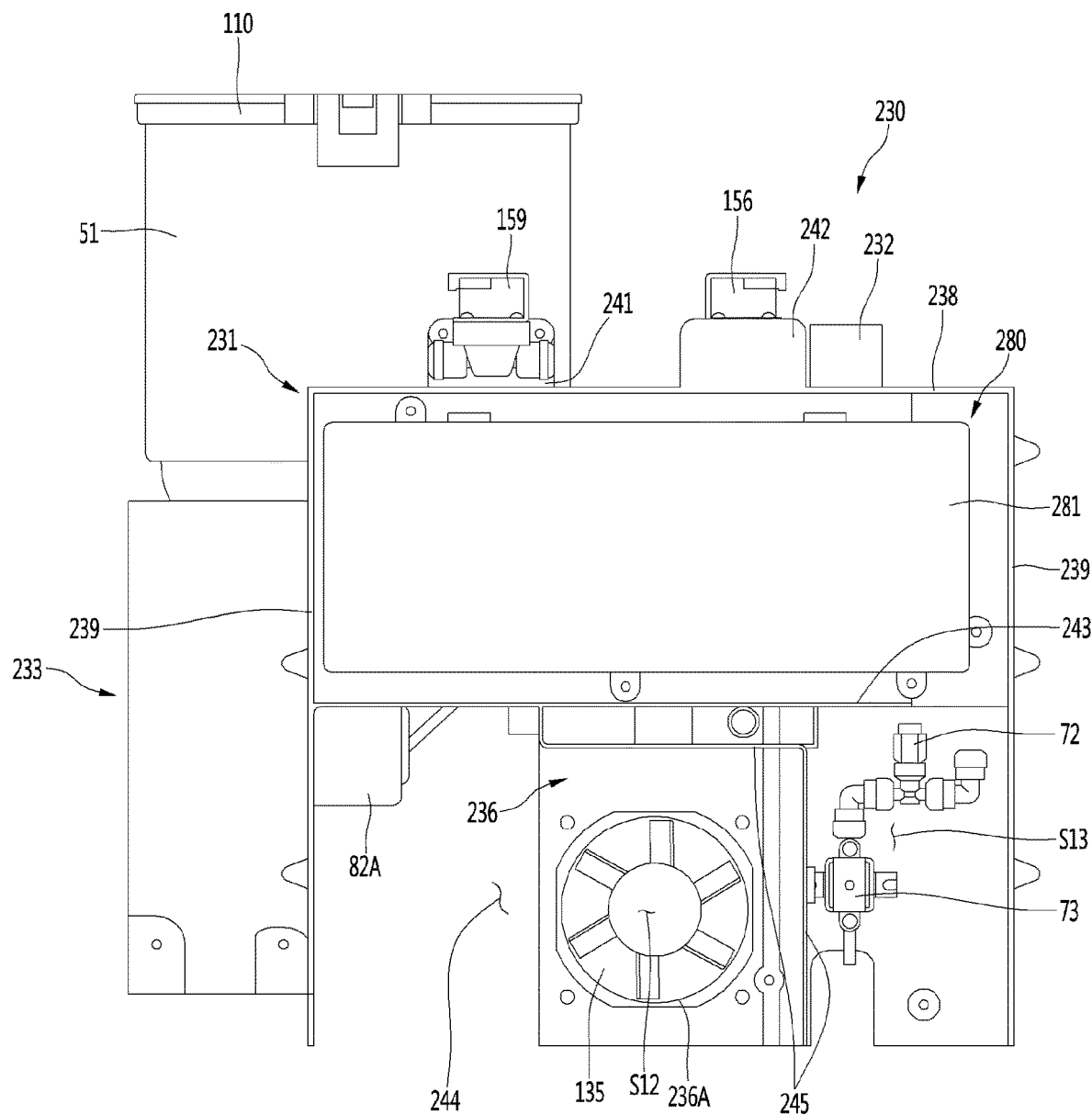
[FIG. 8]

[FIG. 9]
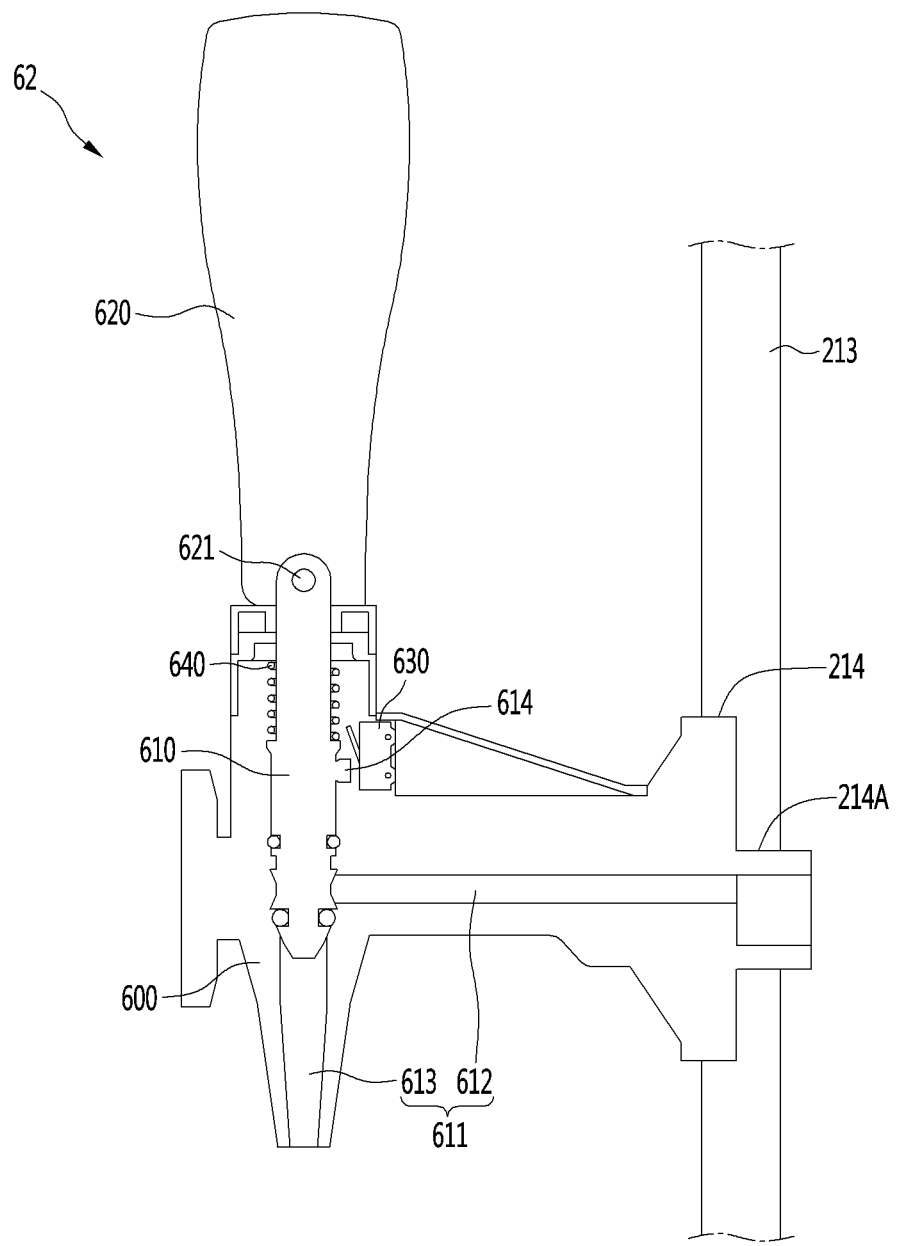

[FIG. 10]
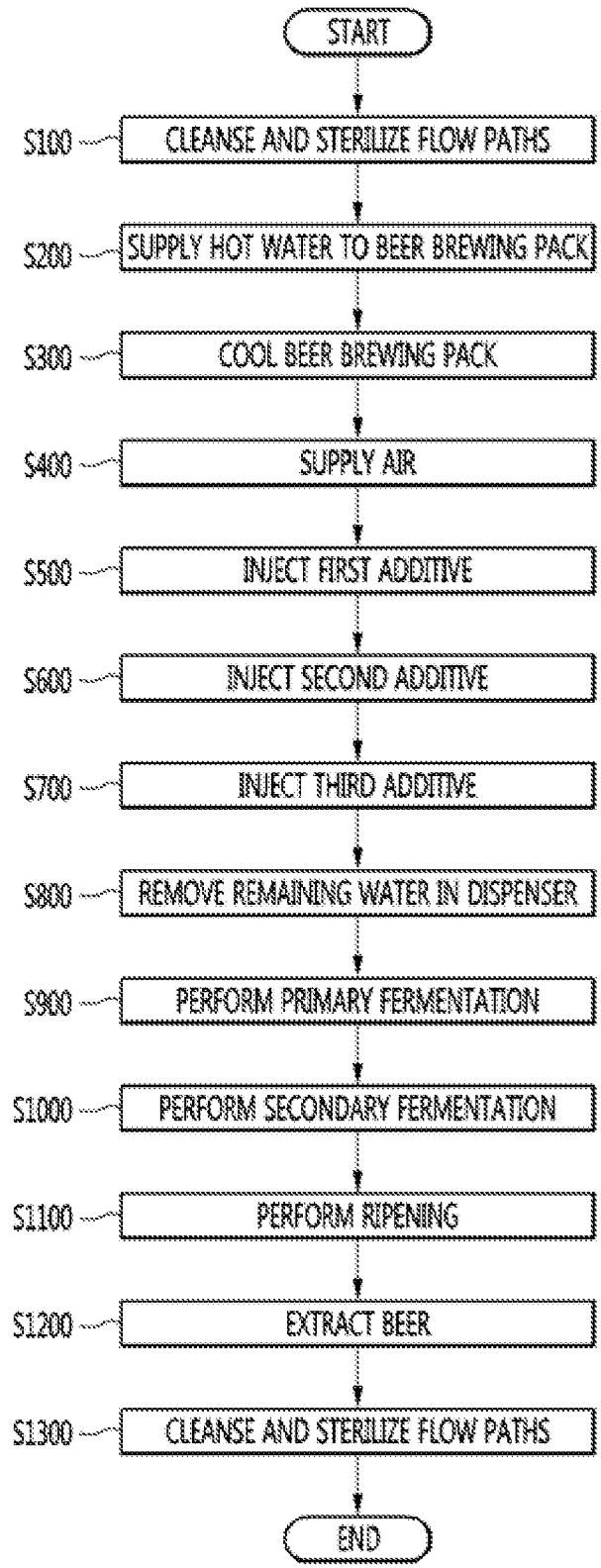

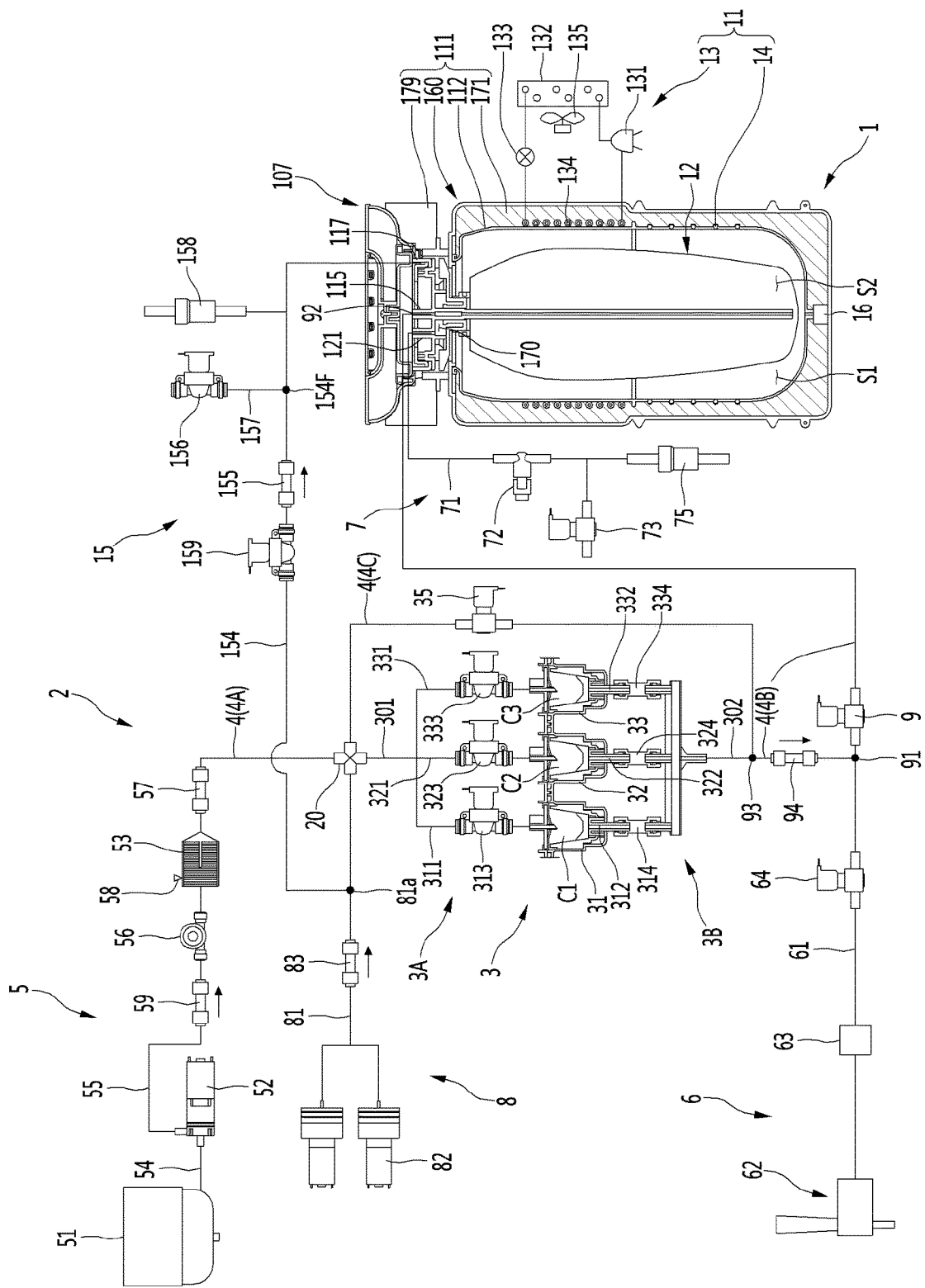
[FIG. 11]

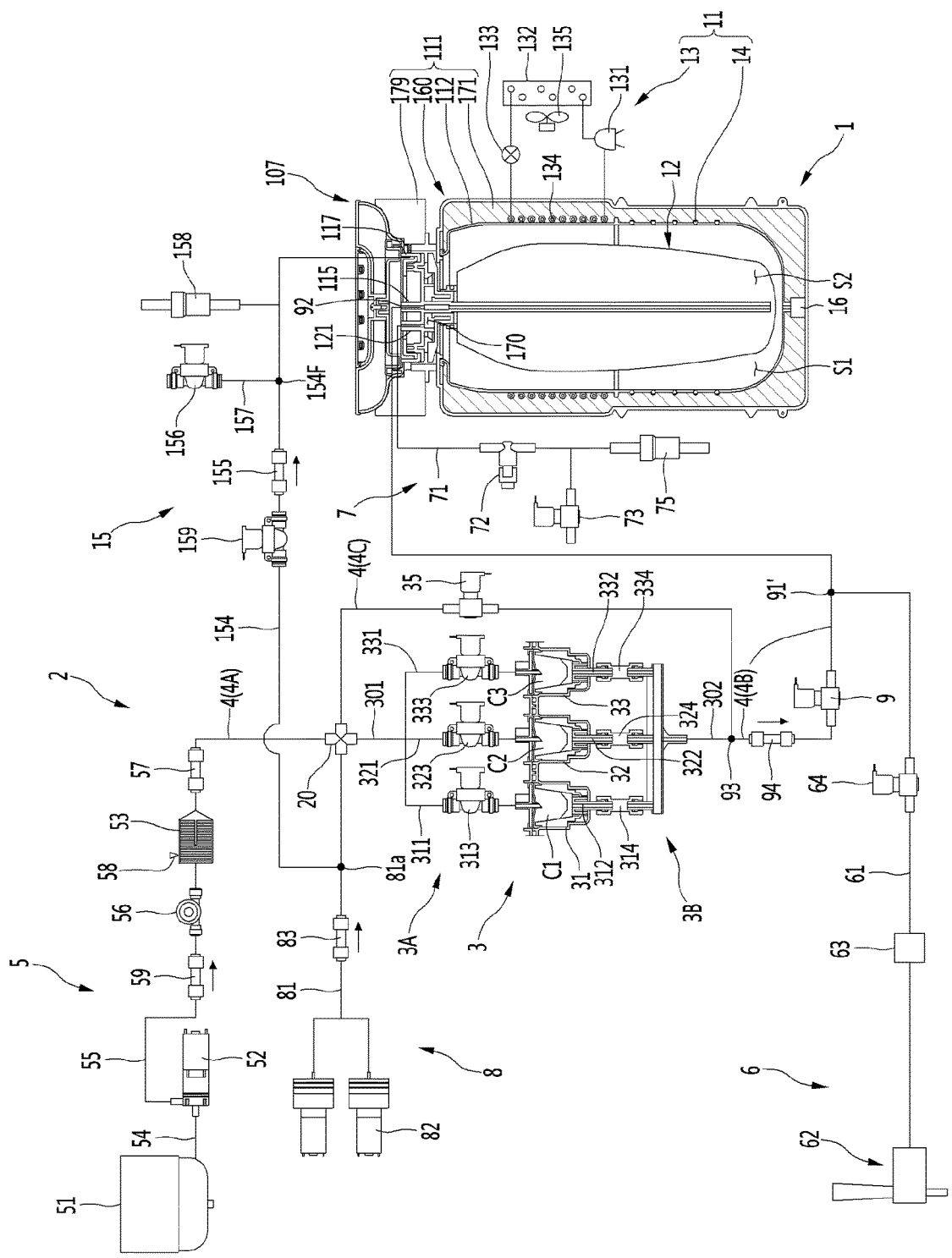
[FIG. 12]

BEVERAGE MAKER

CROSS-REFERENCE TO RELATED PATENT APPLICATIONS

This application is a U.S. National Stage Application under 35 U.S.C. § 371 of PCT Application No. PCT/KR2018/005679, filed May 17, 2018, which claims priority to Korean Patent Application Nos. 10-2017-0063155, filed May 22, 2017 and 10-2017-0067036, filed May 30, 2017, whose entire disclosures are hereby incorporated by reference.

TECHNICAL FIELD

The present disclosure relates to a beverage maker, and more particularly to make a fermented liquid.

BACKGROUND ART

Beverages are collectively referred to as drinkable liquids such as alcoholic drinks and teas. For example, the beverages may be classified into various categories including water (drinking water) for solving thirst, a fruit drink having unique scent and taste, a soft drink providing a feeling of refreshment, a favorite beverage expected to have an arousal effect, an alcoholic beverage having an alcoholic effect, and the like.

Beer is a representative example of such beverages. The beer is an alcoholic drink produced by making juice using malt made by sprouting barley, filtering the juice, adding hops to the filtered juice, and then fermenting the juice using yeast.

A consumer may buy ready-made products produced and sold by beer manufacturers or may drink house beer (or craft beer) produced by directly fermenting materials of beer in a house or a bar.

The house beer may be manufactured in various kinds as compared with the ready-made products, and may be manufactured in accordance with tastes of consumers.

Materials for producing beer may include water, malt, hops, yeast, scent additives, and the like.

The yeast may ferment the malt while being added to the malt, and may help to produce alcohol and carbonic acid.

The scent additives correspond to additives such as fruits, syrup, and vanilla beans, which increase taste of the beer.

In general, the house beer may be produced by totally three steps including a wort generating step, a fermentation step, and a mature step, and two weeks to three weeks may be consumed from the wort generating step to the mature step.

It is important that the house beer maintains an optimum temperature during the fermentation step, and as the house beer is manufactured more simply, convenience of a user may be improved.

In recent years, a beverage maker has gradually been used which may easily produce beer in a house or a bar, and it is preferable that such a beverage maker safely and easily produces beer.

DISCLOSURE

Technical Problem

The present disclosure is to provide a beverage maker, capable of simply making a fermented liquid.

The present disclosure is to provide a compact beverage maker.

The present disclosure is to provide a beverage maker capable of preventing the temperature of parts or a space from being increased due to heat emitted from a condenser.

Technical Solution

According to an embodiment of the present disclosure, a beverage maker may include a base, a fermentation module including a fermentation tank module having an opening, and a fermentation lid to open/close the opening, and disposed on the base, a passage module connected to the fermentation module and including at least one passage and at least one valve, and a main frame disposed on the base, in which at least a part of the passage module is mounted on the main frame.

The passage module may include a water supplying passage module to supply water, a main passage connecting the water supplying passage with module the fermentation module, and a main valve installed in the main passage. The main valve may be mounted on the main frame.

The beverage maker may further include a dispenser connected to the main passage and having at least one material accommodating part. The main passage may include a first main passage located before the dispense in a flow direction of water or the air and connected to the water supplying passage module, a second main passage located after the dispenser 3 in the flow direction of the water, wherein the main valve is installed in the second main passage, and a bypass passage connecting the first main passage and the second main passage and allowing bypass of the material accommodating part.

The passage module may further include a bypass valve configured to open/close the bypass passage and installed in the main frame.

The dispenser may be located above the main frame.

The passage module may include at least one dispenser inlet passage connecting the first main passage to the at least one material accommodating part, and at least one opening/closing valve to open/close the at least dispenser inlet passage. The opening/closing valve may be mounted on the main frame.

The beverage maker may further include an air injection pump configured to inject air into the fermentation module, and a beverage making pack inserted into the fermentation module through the opening and accommodated into the fermentation module. The passage module may include an air supplying passage configured to guide air, which is pumped from the air injection pump, to a space between the beverage making pack and the fermentation tank module, and an air supplying opening/closing valve to open/close the air supplying passage. The air supplying opening/closing valve is mounted on the main frame.

The passage module may further includes an air discharging passage connected to the air supplying passage, and an air discharging valve configured to open/close the air discharging passage. The air discharging valve may be mounted on the main frame.

The passage module includes a gas discharging passage connected to the fermentation module to discharge gas, and a gas discharging valve connected to the gas discharging passage. A gas discharging space is formed in the main frame, the gas discharging valve is disposed in the gas discharging space, and a rear surface of the gas discharging space is open.

The beverage maker may further include a control module configured to control at least one valve included in the passage module. The control module is accommodated in the main frame, and a control module accommodating space having an open rear surface is formed in the main frame.

The main frame may include a frame body in which the at least a part of the passage module is disposed, and a fermentation module contact body provided in the frame body and making contact with the fermentation module.

The fermentation module contact body may include a contact part which is in contact with the fermentation module and formed to be rounded with a curvature equal to a curvature of an outer circumference of the fermentation module.

The beverage maker may further include a water tank configured to store water supplied to the fermentation module and spaced apart from the fermentation module. The main frame further may include a water tank supporter configured to support the water tank such that the water tank is spaced apart from the base.

The main frame may be located in back of the fermentation module and the water tank.

The fermentation module contact body may be horizontally spaced apart from the water tank supporter, the fermentation module contact body may be located closer to one side surface of opposite surfaces of the frame body, and the water tank supporter may be located closer to another surface of the opposite surfaces of the frame body.

The water tank supporter may include a support plate spaced apart upward from the base, in which the water tank is placed on the water tank, and a reinforcement wall extending downward from the support plate.

The beverage maker may further include an air injection pump configured to be able to inject air into the fermentation module. An air injection pump mounting part, in which the air injection pump is mounted, may be formed on the support plate.

A front surface of the frame body may include a first curved surface facing the outer circumference of the fermentation module, and a second curved surface spaced apart from the first curved surface and facing the water tank in a front-rear direction.

According to an embodiment of the present disclosure, a beverage maker may include a base, a fermentation module including a fermentation tank module having an opening, and a fermentation lid configured to open/close the opening, and disposed on the base, a water supplying passage module configured to supply water, a main passage connecting the water supplying passage module to the fermentation module, a main valve configured to open/close the main passage, a beverage dispensing passage connected to the main passage, a sub-valve configured to open/close the beverage dispensing passage, and a main frame disposed on the base, in which at least one of the main valve and the sub-valve is mounted on the main frame.

According to an embodiment of the present disclosure, a beverage maker may include a base, a fermentation module including a fermentation tank module having an opening, and a fermentation lid configured to open/close the opening, and disposed on the base, a cooling cycle device configured to circulate a refrigerant, having a compressor, a condenser, an expansion mechanism, and an evaporator, in which the evaporator adjusts an internal temperature of the fermentation tank module, and a main frame disposed on the base and configured to surround at least a part of a circumference of the condenser.

The beverage maker may further include a blowing fan configured to blow air to the condenser, and mounted on the main frame.

The blowing fan may be interposed between the fermentation module and the compressor in a horizontal direction.

A condenser accommodating space may be formed in the main frame to accommodate the condenser and open at a side opposite to the blowing fan.

The beverage maker may further include a control module configured to control the cooling cycle device, the main frame may further include a control module accommodating space to accommodate the control module, and a partition plate may be interposed between the control module accommodating space and the condenser accommodating space.

The beverage maker may further include a water tank configured to store water supplied to the fermentation module. The main frame may include a frame body, and a water tank supporter provided in the frame body and configured to support the water tank such that the water tank is spaced apart from the base.

The compressor may be interposed between the base and the water tank.

Advantageous Effects

According to an embodiment of the present disclosure, as the passage module is mounted on the main frame, work of mounting or coupling the passage module may be easily performed.

The temperature of the fermentation tank assembly is adjusted by the temperature controller, so the beverage may be made at a proper fermentation temperature.

In addition, as the control module is accommodated in the mainframe, the control module may be protected.

In addition, the main frame includes the fermentation module contact body to determine the mounting position of the fermentation module, so the fermentation module may be mounted at an exact position.

In addition, the main frame includes the frame body, and a part, which faces the fermentation module and the water tank, of the front surface of the frame body is formed in a curved surface, so that beverage maker is realized in compact size in a front-rear direction.

In addition, as the main frame is disposed at a lower portion of the dispenser between the fermentation module and the water tank, the beverage maker may be realized in a compact size in the up-down direction.

Further, the main frame is disposed between the condenser and the fermentation module to prevent the temperature of the fermentation module from being increased due to the heat from the condenser.

In addition, the blowing fan is mounted in the main frame, so the beverage maker may be realized in more compact size.

In addition, as at least a portion of the condenser accommodating space is surrounded by the barrier, the air blown from the blowing fan may pass through the condenser without spreading to the surroundings.

Further, a partition plate is positioned between the control module accommodating space and the condenser accommodating space, thereby preventing the temperature of the control module from being increased due to the heat from the condenser.

In addition, the main frame may include the water tank supporter to space the water tank apart from the based and the compressor may be disposed between the water tank and the base. Accordingly, the beverage maker may be realized in a more compact size.

DESCRIPTION OF DRAWINGS

FIG. 1 is a view illustrating a beverage maker according to an embodiment of the present disclosure;

FIG. 2 is a perspective view illustrating the beverage maker according to the embodiment of the present disclosure;

FIG. 3 is an exploded perspective view illustrating the beverage maker of FIG. 2;

FIG. 4 is a perspective view of a main frame, according to an embodiment of the present disclosure;

FIG. 5 is a perspective view of a main frame illustrated in FIG. 4, when viewed in another direction;

FIG. 6 is a plan view of a main frame illustrated in FIG. 4;

FIG. 7 is a front view when a plurality of components are disposed in the main frame illustrated in FIG. 4;

FIG. 8 is a bottom view when a plurality of components are disposed in the main frame illustrated in FIG. 4;

FIG. 9 is a sectional view illustrating a beverage dispensing valve of the beverage maker, according to an embodiment of the present disclosure;

FIG. 10 is a flowchart illustrating a control sequence for the beverage maker according to the embodiment of the present disclosure;

FIG. 11 is a view illustrating a beverage maker according to another embodiment of the present disclosure; and FIG. 12 is a view illustrating a beverage maker according to another embodiment of the present disclosure.

BEST MODE

Mode for Invention

Hereinafter, detailed embodiments of the present disclosure will be described in detail with reference to the accompanying drawings.

Although beer will be described below as an example of a beverage produced using a beverage maker in the specification, beverages that may be produced using the beverage maker are not limited to the beer, and various kinds of beverages may be produced by a beverage maker according to an embodiment of the present disclosure.

FIG. 1 is a view illustrating a beverage maker according to an embodiment of the present disclosure.

The beverage maker may include a fermentation module 1. The fermentation module 1 may include a fermentation tank module 111 having an opening 170 formed therein, and a fermentation lid 107 configured to open/close the opening 170. Also, the beverage maker may further include a temperature controller 11 configured to adjust the temperature inside the fermentation tank module 111.

The fermentation tank module 111 may include a fermentation case 160, a fermentation tank 112 accommodated in the fermentation case 160 and having an inner space S1 formed therein to communicate with the opening 170, and an insulation part 171 located between the fermentation case 160 and the fermentation tank 112 to surround the fermentation tank 112. The fermentation tank module 111 may further include a lid seated body 179 on which the fermentation lid 107 is seated.

The inner space S1 of the fermentation tank 112 may be a space where a beverage is to be produced.

The beverage maker may further include a passage module 2 connected to the fermentation module 1. The passage module 2 may include at least one passage and at least one valve.

The passage module 2 may include a main passage 4 connected to the fermentation module 1. The main passage 4 may supply water or various materials required for producing the beverage to the inner space S1 of the fermentation tank 112. Also, the passage module 2 may further include a main valve 9 installed in the main passage 4. The main valve 9 may open/close the main passage 4.

The beverage maker may further include a dispenser 3 connected to the main passage 4 and having material accommodating parts formed therein. The passage module 2 may further include a dispenser inlet passage module 3A and a dispenser outlet passage module 3B connecting the dispenser 3 and the main passage 4.

The beverage maker may further include a water tank 51 in which water is stored, and the passage module 2 may further include a water supplying passage module 5 configured to supply the water from the water tank 51 to the main passage 4.

The passage module 2 may further include a beverage discharging passage module 6 configured to discharge the beverage to the outside. The beverage discharging passage module 6 may further include a beverage discharging passage 61 connected to the main passage 4. The beverage inside the fermentation tank 112 may flow to the main passage 4, and may pass through a part of the main passage 4 to flow to the beverage discharging passage 61.

The passage module 2 may further include a gas discharging passage module 7 connected to the fermentation module 1. The gas discharging passage module 7 may discharge gas inside a beverage making pack 12 to the outside. The inner space S1 of the fermentation tank 112 may be a space where the beverage making pack 12 in which the beverage is produced is accommodated. The beverage making pack 12 will be described below in detail.

The beverage maker may further include an air injection pump 82 configured to pump air, and the passage module 2 may further include an air injection passage module 8 connected to the air injection pump 82 to inject the air to the main passage 4.

The passage module 2 may further include an air controlling passage module 15 connected to the fermentation module 1. The air controlling passage module 15 may inject the air into the fermentation module 1 or discharge the air from the fermentation module 1.

A main passage connector 115 may be formed in the fermentation module 1. The main passage 4 may be connected to the main passage connector 115.

The fermentation tank 112 may be an assembly of a plurality of members.

The fermentation lid 107, which is configured to seal the inside of the fermentation tank module 111, may be arranged above the fermentation tank module 111 to cover the opening 170. The main passage connector 115 connected to the main passage 4 may be provided in the fermentation lid 107.

The beverage making pack 12 may be a container separately provided to prevent materials for the beverage and a completed beverage from being stuck to an inner wall of the fermentation tank 112. The beverage making pack 12 may be provided detachably from the fermentation tank 112. The beverage making pack 12 may be seated inside the fermentation tank module 111 to ferment the beverage inside the fermentation tank module 111, and may be withdrawn to the outside of the fermentation tank module 111 after being used.

The beverage making pack 12 may be a pack in which materials for producing the beverage are accommodated. A beverage producing space S2 in which the materials for the beverage are accommodated and the beverage is produced may be formed inside the beverage making pack 12. The beverage making pack 12 may be smaller than the inner space S1 of the fermentation tank 112.

The beverage making pack 12 may be inserted into and accommodated in the fermentation tank module 111 while the materials are accommodated therein. The beverage making pack 12 may be inserted into the fermentation tank module 111 and may be accommodated in the fermentation tank module 111 in a state in which the opening 170 of the fermentation tank module 111 is opened.

After the beverage making pack 12 is inserted into the fermentation tank module 111, the fermentation lid 107 may cover the opening 170 of the fermentation tank module 111. The beverage making pack 12 may help to ferment the materials while being accommodated in the inner space S1 sealed by the fermentation tank 112 and the fermentation lid 107. The beverage making pack 12 may be expanded by the pressure therein while the beverage is being produced, When the beverage contained in the beverage making pack 12 is discharged, and the air is supplied to between the fermentation tank 112 and the beverage making pack 12, the beverage making pack 12 may be compressed by the air inside the fermentation tank 112.

The fermentation case 160 may be an assembly of a plurality of members. The fermentation case 160 may constitute an outer appearance of the fermentation tank module 111.

The fermentation tank 112 may be arranged inside the fermentation case 160. The outer circumference and the bottom surface of the fermentation tank 112 may be spaced apart from the inner surface of the fermentation case 160. In more detail, an outer circumference of the fermentation tank 112 may be spaced apart from an inner circumference of the fermentation case 160, and the outer bottom surface of the fermentation tank 112 may be spaced apart from the inner bottom surface of the fermentation case 160.

The insulation part 171 may be located between the fermentation case 160 and the fermentation tank 112. The insulation part 171 may be located inside the fermentation case 160 to surround the fermentation tank 112. Accordingly, the temperature of the fermentation tank 112 may be maintained constant.

The insulation part 171 may be formed of expanded polystyrene or polyurethane that has high insulation performance and may absorb vibrations.

Meanwhile, the beverage maker may further include a temperature controller configured to change the temperature inside the fermentation tank module 111. In more detail, the temperature controller may change the temperature of the fermentation tank 112.

The temperature controller 11, which is configured to heat or cool the fermentation tank 112, may control the temperature of the fermentation tank 112 to an optimum temperature for fermentation of the beverage.

The temperature controller 11 may include a refrigeration cycle device 13 having a compressor 131, a condenser 132, an expansion mechanism 133, and an evaporator 134, and any one of the condenser 132 and the evaporator 134 may be arranged in the fermentation tank 112. The beverage maker may further include a blower fan 135 configured to cool the condenser 132.

When the condenser 132 is arranged in the fermentation tank 112, the refrigeration cycle device 13 may heat the fermentation tank 112 to adjust the temperature of the fermentation tank 112. In this case, the condenser 132 may be arranged to be in contact with the outer surface of the fermentation tank 112. The condenser 132 may include a condensation tube wound on the outer surface of the fermentation tank 112.

When the evaporator 134 is arranged in the fermentation tank 112, the refrigeration cycle device 13 may cool the fermentation tank 112 to adjust the temperature of the fermentation tank 112. In this case, the evaporator 134 may be arranged to be in contact with the outer surface of the fermentation tank 112. The evaporator 134 may be an evaporation tube wound on the outer surface of the fermentation tank 112. The evaporator 134 may be accommodated between the fermentation tank 112 and the insulation part 171, and may cool the fermentation tank 112 insulated by the insulation part 171.

When the evaporator 134 is arranged in the fermentation tank 112, the temperature controller 11 may further include a heater 14 configured to heat the fermentation tank 112. The heater 14 may be installed to be in contact with the outer surface of the fermentation tank 112, and may be a heating heater heated when electric power is applied thereto. The heater 14 may be a line heater, and may be wound on the outer surface of the fermentation tank 112.

The heater 14 may be located below the evaporator 134. In more detail, the evaporator 134 may be wound on an upper portion of the outer surface of the fermentation tank 112, and the heater 14 may be wound on a lower portion of the outer surface of the fermentation tank 112. Accordingly, fluid may be naturally convected inside the fermentation tank 112, and temperature distribution inside the beverage making pack 12 may become uniform.

The refrigeration cycle device 13 may be a heat pump. The refrigeration cycle device 13 may include a refrigerant passage switching valve (not illustrated). The refrigerant passage switching valve may be a four-way valve. The refrigerant passage switching valve may be connected to a suction passage of the compressor 131 and a discharge passage of the compressor 131, may be connected to the condenser 132 through a condenser connecting passage, and may be connected to the evaporator 134 through an evaporator connecting passage.

When the fermentation tan 112 is cooled, the refrigerant passage switching valve may guide a refrigerant compressed by the compressor 131 to the condenser 132, and may guide the refrigerant discharged from the evaporator 134 to the compressor 131.

When the fermentation tan 112 is heated, the refrigerant passage switching valve may guide the refrigerant compressed by the compressor 131 to the evaporator 134, and may guide the refrigerant discharged from the condenser 132 to the compressor 131 as well.

Meanwhile, when beer is produced using the beverage maker, materials for producing the beer may include water, malt, yeast, hops, scent additives, and the like.

The beverage maker may include both the dispenser 3 and the beverage making pack 12, and the materials for producing the beverage may be distributed and accommodated in the dispenser 3 and the beverage making pack 12. Some materials among the materials for producing the beverage may be accommodated in the beverage making pack 12, and the other materials may be accommodated in the dispenser 3. The other materials accommodated in the dispenser 3 together with the water supplied from the water supplying passage module 5 may be supplied to the beverage making pack 12, and may be mixed with some materials accommodated in the beverage making pack 12.

A main material necessary for producing the beverage may be accommodated in the beverage making pack 12, and additives added to the main material may be accommodated in the dispenser 3. In this case, the additives accommodated in the dispenser 3 may be supplied to the beverage making pack 12 while being mixed with the water supplied from the water supplying passage module 5, and may be mixed with the main material accommodated in the beverage making pack 12.

The main material accommodated in the beverage making pack 12 may be a material having a larger capacity than those of the other materials. For example, in the case of the beer, the main material may be the malt among the malt, the yeast, the hops, and the scent additives. Further, the additives accommodated in the dispenser 3 may correspond to the other materials except for the malt among the materials for producing the beer, and the other materials may include the yeast, the hops, the scent additives, and the like.

The beverage maker may not include the dispenser 3 and may include the beverage making pack 12. In this case, the main material may be accommodated in the beverage making pack 12, and a user may directly insert the additives into the beverage making pack 12.

When the beverage maker includes both the dispenser 3 and the beverage making pack 12, the beverage may be produced more simply. For convenience of description, an example where both the dispenser 3 and the beverage making pack 12 are included will be described below. However, it is apparent that the present disclosure is not limited to the example where both the dispenser 3 and the beverage making pack 12 are included.

The materials inside the beverage making pack 12 may be fermented as a time elapses, and the completely produced beverage inside the beverage making pack 12 may flow to the main passage 4 through the main passage connector 115, and may flow from the main passage 4 to the beverage discharging passage module 6 to be discharged.

The main passage 4 may have one end connected to the water supplying passage module 5, and may have the other end connected to the main passage connector 115 formed in the fermentation module 1.

The dispenser 3 may be connected to the main passage 4. The water or the air of the main passage 4 may be introduced into the dispenser 3, and may flow in the dispenser 3.

The materials necessary for producing the beverage may be accommodated in the dispenser 3, and the water supplied from the water supplying passage module 5 may pass through the dispenser 3. For example, when the beverage produced by the beverage maker is the beer, materials accommodated in the dispenser 3 may include yeast, hops, scent additives, and the like.

The materials accommodated in the dispenser 3 may be directly accommodated in the material accommodating parts formed in the dispenser 3. At least one material accommodating part may be formed in the dispenser 3. The plurality of material accommodating parts may be formed in the dispenser 3. In this case, the plurality of material accommodating parts may be partitioned from each other.

Meanwhile, the materials accommodated in the dispenser 3 may be accommodated in capsules C1, C2, and C3, and at least one capsule accommodating part 31, 32, and 33 in which such capsules C1, C2, and C3 are accommodated may be formed in the dispenser 3.

When the materials are accommodated in the capsules C1, C2, and C3, in the dispenser 3, the capsules C1, C2, and C3 may be seated and withdrawn. The dispenser 3 may be a capsule kit assembly in which the capsules C1, C2, and C3 are separately accommodated.

The materials accommodated in the material accommodating parts or the capsules C1, C2, and C3 may be extracted by water supplied from the water supplying passage module 5 or air injected from the air injection passage module 8.

When the materials are extracted by water, the water supplied from the water supplying passage module 5 to the main passage 4 may be mixed with the materials while passing through the material accommodating parts or the capsules C1, C2, and C3, and the materials accommodated in the material accommodating parts or the capsules C1, C2, and C3 together with the water may flow to the main passage 4.

When the materials are extracted by air, the air injected from the air injection passage module 8 to the dispenser 3 may push out the materials while passing through the material accommodating parts or the capsules C1, C2, and C3, and the materials accommodated in the material accommodating parts or the capsules C1, C2, and C3 together with the air may flow to the main passage 4.

A plurality of different kinds of additives may be accommodated in the dispenser 3 while being separated from each other. For example, when the beer is produced, the plurality of additives accommodated in the dispenser 3 may include the yeast, the hops, and the scent additives, which may be accommodated while being separated from each other.

When the plurality of material accommodating parts may be formed in the dispenser 3, each of the plurality of material accommodating parts may be connected to the main passage 4 and the dispenser inlet passage module 3A or may be connected to the main passage 4 and the dispenser outlet passage module 3B.

When the plurality of capsule accommodating parts 31, 32, and 33 are formed in the dispenser 3, each of the plurality of capsule accommodating parts 31, 32, and 32 may be connected to the main passage 4 and the dispenser inlet passage module 3A or may be connected to the main passage 4 and the dispenser outlet passage module 3B.

The material accommodating parts of the dispenser 3 and the capsule accommodating parts of the dispenser 3 may have substantially the same configuration. When the capsules are inserted into the dispenser 3 in a state in which the materials are accommodated in the capsules, the capsules may be named the capsule accommodating parts, and when the capsules are directly accommodated in the dispenser 3 in a state in which the materials are not contained in the capsules, the capsules may be named the material accommodating parts. Since the material accommodating parts and the capsule accommodating parts have substantially the same configuration, for convenience of description, an example where the capsule accommodating parts are formed in the dispenser 3 will be described below.

The dispenser 3 may have the capsule accommodating parts 31, 32, and 33 formed therein in which the capsules containing the additives are detachably accommodated, and may be connected to the main passage 4 and the dispenser inlet passage module 3A or may be connected to the main passage 4 and the dispenser outlet passage module 3B.

The dispenser inlet passage module 3A may include dispenser inlet passages 301, 311, 321, and 331 connecting the main passage 4 and the capsule accommodating parts 31, 32, and 33. The dispenser inlet passage module 3A may further include opening/closing valves 313, 323, and 333 installed in the dispenser inlet passages 301, 311, 321, and 331. The opening/closing valves 313, 323, and 33 may open/close the dispenser inlet passages 301, 311, 321, and 331.

The dispenser outlet passage module 3B may include dispenser outlet passages 301, 311, 321, and 331 connecting the capsule accommodating parts 31, 32, and 33 and the main passage 4. The dispenser outlet passage module 3B may further include check valves 314, 324, and 334 installed in the dispenser outlet passages 301, 311, 321, and 331. The check valves 314, 324, and 334 may prevent the water or the air from flowing backward to the capsule accommodating parts 31, 32, and 33 through the dispenser outlet passages 302, 312, 322, and 332.

The dispenser 3 may have the plurality of capsule accommodating parts 31, 32, and 33 formed therein while the plurality of capsule accommodating parts 31, 32, and 33 may be separated from each other. Each of the plurality of capsule accommodating parts 31, 32, and 33 may be connected to the corresponding dispenser inlet passage and the corresponding dispenser outlet passage.

Hereinafter, a first additive, a second additive, and a third additive may be accommodated in the dispenser 3. The first additive may be yeast, the second additive may be hops, and the third additive may be scent additives.

The dispenser 3 may include a first capsule accommodating part 31 in which the first capsule C1 containing the first additive is accommodated, a second capsule accommodating part 32 in which the second capsule C2 containing the second additive is accommodated, and a third capsule accommodating part 33 in which the third capsule C3 containing the third additive is accommodated.

The first dispenser inlet passage 311 configured to guide the water or the air to the first capsule accommodating part 31 may be connected to the first capsule accommodating part 31, and the first dispenser outlet passage 312 configured to guide the water, a mixture of the water and the first additive, and the air from the first capsule accommodating part 31 may be connected to the first capsule accommodating part 31. The first opening/closing valve 313 configured to open/close the first dispenser inlet passage 311 may be installed in the first dispenser inlet passage 311. The first check valve 314 configured to prevent fluid in the first capsule accommodating part 31 from flowing backward to the first capsule accommodating part 31 through the first dispenser outlet passage 312 while the fluid flows to the main passage 4 may be installed in the first dispenser outlet passage 312. Here, the fluid may be the water, the mixture of the water and the first additive, and the air, which are discharged from the first capsule accommodating part 31.

The second dispenser inlet passage 321 configured to guide the water or the air to the second capsule accommodating part 32 may be connected to the second capsule accommodating part 32, and the second dispenser outlet passage 322 configured to guide the water, a mixture of the water and the first additive, and the air from the second capsule accommodating part 32 may be connected to the second capsule accommodating part 31. The second opening/closing valve 323 configured to open/close the second dispenser inlet passage 321 may be installed in the second dispenser inlet passage 321. The second check valve 324 configured to prevent fluid in the second capsule accommodating part 32 from flowing backward to the second capsule accommodating part 32 through the second dispenser outlet passage 322 while the fluid flows to the main passage 4 may be installed in the second dispenser outlet passage 322. Here, the fluid may be the water, the mixture of the water and the second additive, and the air, which are discharged from the second capsule accommodating part 32.

The third dispenser inlet passage 331 configured to guide the water or the air to the third capsule accommodating part 33 may be connected to the third capsule accommodating part 33, and the third dispenser outlet passage 332 configured to guide the water, a mixture of the water and the first additive, and the air from the third capsule accommodating part 33 may be connected to the third capsule accommodating part 31. The third opening/closing valve 333 configured to open/close the third dispenser inlet passage 331 may be installed in the third dispenser inlet passage 331. The third check valve 334 configured to prevent fluid in the third capsule accommodating part 33 from flowing backward to the third capsule accommodating part 33 through the third dispenser outlet passage 332 while the fluid flows to the main passage 4 may be installed in the third dispenser outlet passage 332. Here, the fluid may be the water, the mixture of the water and the third additive, and the air, which are discharged from the third capsule accommodating part 33.

When the beverage maker includes the dispenser 3, the main passage 4 may include a first main passage 4A located before the dispenser 3 in a flow direction of the water or the air, and a second main passage 4B located after the dispenser 3 in the flow direction of the water or the air.

The main passage 4 may further include a bypass passage 4C connecting the first main passage 4A and the second main passage 4B and allowing the water or the air to bypass the material accommodating parts of the dispenser 3. The bypass passage 4C may bypass the capsule accommodating parts 31, 32, and 33 of the dispenser 3.

Here, the first main passage 4A may be connected to the water supplying passage module 5, and the second main passage 4B may be connected to the fermentation module 1. Further, the bypass passage 4C may connect such a first main passage 4A and such a second main passage 4B, and at the same time, allow the water or the air to bypass the dispenser 3.

The main passage 4 may be configured as one passage when the beverage maker does not include the dispenser 3, and may include the first main passage 4A, the second main passage 4B, and the bypass passage 4C when the beverage maker includes the dispenser 3.

The bypass passage 4C may be connected in parallel to a passage of the first capsule accommodating part 31, a passage of the second capsule accommodating part 32, and a passage of the third capsule accommodating part 33, The passage module 2 may further include a bypass valve 35 installed in the bypass passage 4C to open/close the bypass passage 4C.

The first main passage 4A may be connected to a common dispenser inlet passage 301 and the bypass passage 4C. The common dispenser inlet passage 301 may be connected to the first dispenser inlet passage 311, the second dispenser inlet passage 321, and the third dispenser inlet passage 331.

The common dispenser inlet passage 301 may include a common pipe connected to the first main passage 4A, and a plurality of branching pipes branched from the common pipe and connected to the first dispenser inlet passage 311, the second dispenser inlet passage 321, and the third dispenser inlet passage 331, respectively.

The second main passage 4B may be connected to a common dispenser outlet passage 302 and the bypass passage 4C. The common dispenser outlet passage 302 may be connected to the first dispenser outlet passage 312, the second dispenser outlet passage 322, and the third dispenser outlet passage 332.

The common dispenser outlet passage 302 may include a common pipe connected to the second main passage 4B, and a plurality of branching pipes connecting the common pipe to the first dispenser outlet passage 312, the second dispenser outlet passage 322, and the third dispenser outlet passage 332, respectively.

When the bypass valve 34 is closed, the water or the air supplied to the first main passage 4A may pass through the capsule accommodating parts 31, 32, and 33 to bypass the bypass passage 4C, and may flow to the second main passage 4B.

In contrast, when the opening/closing valves 311, 321, and 331 are closed, the water or the air supplied to the first main passage 4A may pass through the bypass passage 4C to bypass the capsule accommodating parts 31, 32, and 33, and may flow to the second main passage 4B.

The beverage maker may further include a water supplying pump 52 configured to pump the water, and a water supplying heater 53 configured to heat the water pumped by the water supplying pump 52. The water supplying passage module 5 may further include a water tank outlet passage 54 connecting the water tank 51 and the water supplying pump 52, and a water supplying pump outlet passage 55 connecting the water supplying pump 52 and the main passage 4. The water supplying heater 53 may be installed in the water supplying pump outlet passage 55.

Also, the water supplying passage module 5 may further include a water supplying check valve 59 installed in the water supplying pump outlet passage 55 to prevent the water from flowing backward to the water supplying pump 52.

A flow meter 56 configured to measure a flow rate of the water supplying pump outlet passage 55 may be installed in the water supplying pump outlet passage 55. The flow meter 56 may be arranged after the water supplying check valve 59 along the flow direction of the water.

The water supplying heater 53 may be a mold heater, and may include a heater case through which the water pumped by the water supplying pump 52 passes, and a heating heater installed inside the heater case to heat the water introduced into the heater case, in an interior thereof.

A thermal fuse 58 configured to interrupt a current applied to the water supplying heater 53 as a circuit is cut off when a temperature is high may be installed in the water supplying heater 53.

The beverage maker may further include a thermistor 57 configured to measure the temperature of the water passing through the water supplying heater 53. The thermistor 57 may be installed in the water supplying heater 53. Alternatively, the thermistor 57 may be arranged at a portion of the water supplying pump outlet passage 55, which is located after the water supplying heater 53 along the flow direction of the water. Also, the thermistor 57 may also be installed in the first main passage 4A.

When the water supplying pump 52 is operated, the water in the water tank 51 may be guided to the water supplying heater 53 through the water tank outlet passage 54, the water supplying pump 52, and the water supplying pump outlet passage 55, and the water guided to the water supplying heater 53 may be guided to the main passage 4 after being heated by the water supplying heater 53.

Meanwhile, the beverage maker may not include the water tank 51, the water supplying pump 52, and the water supplying heater 53. In this case, the water supplying passage module 5 may be directly connected to a faucet or be connected to the faucet through a separate connection hose, to guide the water to the main passage 4.

The beverage maker may not include the water tank 51 and the water supplying pump 52, and may include the water supplying heater 53. In this case, the water supplying passage module 5 may be directly connected to the faucet or be connected to the faucet through the separate connection hose, to guide the water to the main passage 4, and the water supplying heater 53 may heat the water passing through the water supplying passage module 5.

The beverage discharging passage module 6 may be connected to the main passage 4. The beverage discharging passage module 6 may include the beverage discharging passage 61 which is connected to the main passage 4 and to which the beverage of the main passage 4 is guided. The beverage discharging passage module 6 may further include a beverage discharging valve 62 connected to the beverage discharging passage 61.

The beverage discharging passage 61 may be connected between the water supplying passage module 5 and the fermentation module 1 in the main passage 4. The beverage discharging passage 61 may be connected between the dispenser 3 and the fermentation module 1 in the main passage 4. The beverage discharging passage 61 may be connected to the second main passage 4B.

An anti-foaming part 63 may be provided in the beverage discharging passage 61, and foam of the beverage flowing from the main passage 4 to the beverage discharging passage 61 may be minimized while passing through an anti-forming path. A mesh and the like by which the foam is filtered may be provided in the anti-foaming part 63.

The beverage discharging valve 62 may include a tap valve having a lever 620 that the user manipulates and a limit switch 630 (a micro switch, see FIG. 9) configured to detect the manipulation by the user.

The gas discharging passage module 7 may include a gas discharging passage 71 connected to the fermentation module 1, a pressure sensor 72 installed in the gas discharging passage 71, and a gas discharging valve 73 connected to the gas discharging passage 71 after the pressure sensor 72 in a gas discharging direction.

The gas discharging passage 71 may be connected to the fermentation module 1, particularly, the fermentation lid 107. A gas discharging passage connector 121 to which the gas discharging passage 71 is connected may be provided in the fermentation module 1. The gas discharging passage connector 121 may be provided in the fermentation lid 107.

Gas in the beverage making pack 12 may flow to the gas discharging passage 71 and the pressure sensor 72 through the gas discharging passage connector 121. The pressure sensor 72 may detect the pressure of the gas discharged from the beverage making pack 12 via the gas discharging passage connector 121 to the gas discharging passage 71.

The gas discharging valve 73 may be switched on and opened when the air is injected into the beverage making pack 12 by the air injection passage module 8. The beverage maker may inject the air into the beverage making pack 12 to evenly mix the malt and the water. At this time, the foam generated in the liquid malt may be discharged from an upper portion of the beverage making pack 12 via the gas discharging passage 71 and the gas discharging valve 73 to the outside.

The gas discharging valve 73 may be switched on and opened to detect a degree of fermentation during a fermentation process, and may be switched off and closed.

The gas discharging passage module 7 may further include a gas discharging relief valve 75 connected to the gas discharging passage 71. The gas discharging relief valve 75 may be connected to the gas discharging passage 71 after the pressure sensor 72 in the gas discharging direction.

The air injection passage module 8 may be connected to the main passage 4 to inject the air into the main passage 4.

The air injection passage module 8 may be connected before the dispenser 3 in a water flowing direction, and in this case, may inject the air into the dispenser 3 through the main passage 4. The air injection passage module 8 may be connected to the first main passage 4A. The air injected from the air injection passage module 8 to the main passage 4 may be injected into the beverage making pack 12 after passing through the dispenser 3. The air injected from the air injection passage module 8 to the main passage 4 may bypass the dispenser 3 to be injected into the beverage making pack 12.

The air injection passage module 8 may inject the air into the capsule accommodating parts 31, 32, and 33 through the main passage 4, and residual water or dregs in the capsules C1, C2, and C3 or the capsule accommodating parts 31, 32, and 33 may flow to the main passage 4 by the air injected by the air injection passage module 8. The capsules C1, C2, and C3 and the capsule accommodating parts 31, 32, and 33 may be maintained clean by the air injected by the air injection passage module 8.

The air injection passage module 8 may include the air injection passage 81 connecting the air injection pump 82 and the main passage 4. The air injection pump 82 may pump the air to the air injection passage 81.

The air injection passage 81 may be connected between the water supplying passage module 5 and the dispenser 3 in the water flowing direction. The air injection passage 81 may be connected to the first main passage 4A of the main passage 4.

The air injection passage module 8 may further include an air injection check valve 83 configured to prevent the water guided from the water supplying passage module 5 to the main passage 4 from being introduced into the air injection pump 82 through the air injection passage 81. The air injection check valve 83 may be installed after the air injection pump 82 in an air injecting direction.

In order to improve an output of the air injection pump 82, the air injection pump 82 may include a plurality of air pumps connected to parallel to each other. In this case, the air injection passage 81 may include a common pipe connected to the main passage 4, and a plurality of joining pipes connecting the plurality of air pumps to the common pipe, respectively.

Meanwhile, the passage module 2 may include the main valve 9 configured to open/close the main passage 4. Also, the passage module 2 may further include a main check valve 94 installed in the main passage 4.

The main passage 4 may include a first connector 91 connected to the beverage discharging passage 61, and a second connector connected to the main passage connector 115 formed in the fermentation module 1. Also, the main passage 4 may further include a third connector 93 connected to the dispenser outlet passages 302, 312, 322, and 332.

The main valve 9 may be installed between the first connector 91 and the second connector 92.

The main check valve 94 may be installed between the first connector 91 and the third connector 93. The main check valve 94 may be installed in a direction in which the water, the air, or a mixture thereof may flow from the third connector 93 to the first connector 91.

When the water is supplied to the beverage making pack 12, the main valve 9 may be opened to open the main passage 4. While the fermentation tank 112 is cooled, the main valve 9 may be closed to close the main passage 4. When the air is injected into the beverage making pack 12, the main valve 9 may be opened to open the main passage 4. When the additives are supplied into the beverage making pack 12, the main valve 9 may be opened to open the main passage 4. While the materials are fermented, the main valve 9 is closed to seal the inside of the beverage making pack 12. When the beverage is matured and stored, the main valve 9 may be closed to seal the inside of the beverage making pack 12. When the beverage is discharged by the beverage discharging passage module 6, the main valve 9 may be opened to open the main passage 4, and the beverage inside the beverage making pack 12 may pass through the main valve 9 to flow to the beverage discharging passage 61.

When the beverage is discharged by the beverage discharging passage module 6, the main check valve 94 may prevent the beverage passing through the main valve 9 from flowing backward to the dispenser 3.

Meanwhile, the beverage maker may include the air controlling passage module 15 configured to supply the air into the fermentation tank 112 or discharge the air inside the fermentation tank 112.

The air controlling passage module 15 may supply the air to a space between the beverage making pack 12 and the inner wall of the fermentation tank 112 or, in contrast, may discharge the air between the beverage making pack 12 and the inner wall of the fermentation tank 112 to the outside.

The air controlling passage module 15 may include an air supplying passage 154 connected to the fermentation module 1, and an air discharging valve 156 connected to the air supplying passage 154 to discharge the air to the outside.

The air supplying passage 154 may have one end connected to the fermentation module 1, and the other end connected to the air injection passage 81.

The air supplying passage 154 may be connected to the fermentation module 1, particularly, the fermentation lid 107. An air supplying passage connector 117 to which the air supplying passage 154 is connected may be provided in the fermentation module 1. The air supplying passage connector 117 may be provided in the fermentation case 160.

The air supplying passage 154 may be connected to the air injection passage 81 of the air injection passage module 8. A connector 81a between the air supplying passage 154 and the air injection passage 81 may be located after the air injection check valve 83 along a flow direction of the air passing through the air injection passage 81.

In this case, the air pumped by the air injection pump 82 may sequentially pass through the air injection passage 81 and the air supplying passage 154, to be guided to the space between the beverage making pack 12 and the inner wall of the fermentation tank 112. The air injection pump 82 and the air supplying passage 154 may function as an air supplier configured to supply the air to the space between the beverage making pack 12 and the fermentation tank 112.

On the other hand, a separate air supplying pump may be connected to the air controlling passage module 15. In this case, the air supplying passage 154 may be connected to the air supplying pump without being connected to the air injection passage 81. However, as described above, it is more preferable in terms of cost reduction that the air injecting pump 82 is configured both to inject the air into the beverage making pack 12 and to supply the air to the space between the beverage making pack 12 and the fermentation tank 112.

The air supplying passage 154 and the air discharging valve 156 may function as an air discharging passage configured to discharge the air between the beverage making pack 12 and the fermentation tank 112 to the outside.

The air supplying passage 154 may be connected to the fermentation module 1 to supply the air to the space between the fermentation tank 112 and the beverage making pack 12.

The air supplying passage 154 may have one end connected to the air injection passage 81 and the other end connected to the fermentation module 1.

In a state in which the beverage making pack 12 is accommodated in the fermentation tank module 111, the air injection pump 82 and the air supplying passage 154 may supply the air to the space between the beverage making pack 12 and the fermentation tank 112. In this way, the air supplied into the fermentation tank 112 may press the beverage making pack 12 between the beverage making pack 12 and the fermentation tank 112.

The beverage in the beverage making pack 12 may be pressurized by the beverage making pack 12 pressed by the air, and when the main valve 9 and the beverage discharging valve 62 are opened, may pass through the main passage connector 115 to flow to the main passage 4. The beverage flowing from the beverage making pack 12 to the main passage 4 may be discharged to the outside through the beverage discharging passage module 6.

When the beverage is completely produced, the beverage maker may discharge the beverage inside the beverage making pack 12 to the beverage discharging passage module 6 in a state in which the beverage making pack 12 is located inside the fermentation module 1 without being extracted to the outside of the fermentation module 1.

The air injection pump 82 may supply the air to form a predetermined pressure between the beverage making pack 12 and the fermentation tank 112, and a pressure by which the beverage inside the beverage making pack 12 is easily discharged may be formed between the beverage making pack 12 and the fermentation tank 112.

The air injection pump 82 may maintain an OFF state while the beverage is discharged, and may be driven or then stopped for next discharging of the beverage when the beverage is completely discharged.

The air discharging valve 156 may be located outside the fermentation module 1. The air discharging valve 156 may be connected to a portion of the air supplying passage 154, which is located outside the fermentation tank 112.

The air controlling passage module 15 may further include an air discharging passage 157 connecting the air discharging valve 156 and the air supplying passage 154.

The air supplying passage 154 may include a first passage extending from the connector 81a connected to the air injection passage 81 to a connector 154F connected to the air discharging passage 157 and a second passage extending from the connector 154F connected to the air discharging passage 157 to the air supplying passage connector 117. The first passage may be an air supplying passage configured to guide the air pumped by the air injection pump 82 to the second passage. Further, the second passage may an air supplying and discharging-combined passage configured to supply the air passing through the air supplying passage to the space between the fermentation tank 112 and the beverage making pack 12 or to guide the air discharged from the space between the fermentation tank 112 and the beverage making pack 12 to the air discharging passage 157.

When the beverage making pack 12 is expanded while the beverage is produced, the air discharging valve 156 may be opened such that the air between the beverage making pack 12 and the fermentation tank 112 is discharged to the outside, The air discharging valve 156 may be controlled to be opened when the water is supplied by the water supplying passage module 5. The air discharging valve 156 may be controlled to be opened when the air is injected by the air injection passage module 8.

When the beverage inside the beverage making pack 12 is completely discharged, the air discharging valve 156 may be opened such that the air between the beverage making pack 12 and the fermentation tank 112 is extracted to the outside. The user may extract the beverage making pack 12 to the outside of the fermentation tank 112 after the beverage is completely discharged. This is because a safety accident may occur when the inside of the fermentation tank 112 may be maintained in a high pressure. The air discharging valve 156 may be controlled to be opened when the beverage inside the beverage making pack 12 is completely discharged.

The air controlling passage module 15 may further include an air relief valve 158 connected between the fermentation module 1 and the connector 154F between the air supplying passage 154 and the air discharging passage 157.

The air controlling passage module 15 may further include an air supplying opening/closing valve 159 configured to regulate the air pumped by the air injection pump 82 and supplied to the space between the beverage making pack 12 and the fermentation tank 112.

The air supplying opening/closing valve 159 may be installed in the air supplying passage 154. In more detail, the air supplying opening/closing valve 159 may be installed between the connector 81a of the air injection passage 81 and the connector 154F of the air discharging passage 157 in the air supplying passage 154.

The air controlling passage module 15 may further include an air supplying check valve 155 installed in the air supplying passage 154.

The air supplying check valve 155 may be installed between the connector 81a of the air injection passage 81 and the connector 154F of the air discharging passage 157 in the air supplying passage 154. The air supplying check valve 155 may be arranged after the air supplying opening/closing valve 159 along the flow direction of the air guided from the air injection passage 81 to the air supplying passage 154.

The air supplying check valve 155 may prevent the air from flowing to the air injection passage 81 when the air between the beverage making pack 12 and the fermentation tank 112 is discharged.

Meanwhile, the passage module 2 may further include a passage switching valve 20 installed in the main passage 4.

The passage switching valve 20 may be a four-way valve. The passage switching valve 20 may be arranged before the dispenser 3 with respect to a flow direction of the water flowing in the water supplying passage module 5 or the air injected from the air injection passage module 8.

The passage switching valve 20 may be installed in a connector of the first main passage 4A and the bypass passage 4C of the main passage 4. The air injection passage 81 and the dispenser inlet passages 301, 311, 321, and 331 may be connected to the passage switching valve 20.

The passage switching valve 20 may allow the first main passage 4A to communicate with the bypass passage 4C or the dispenser inlet passages 301, 311, 321, and 331. Also, the passage switching valve 20 may allow the air injection passage 81 to communicate with the dispenser inlet passages 301, 311, 321, and 331 or the bypass passage 4C.

When the passage switching valve 20 allows the first main passage 4A to communicate with the dispenser inlet passages 301, 311, 321, and 331, the water supplied from the water supplying passage module 5 may be guided to the dispenser 3, and may pass through the capsule accommodating parts 31, 32, and 33 to flow to the second main passage 4B.

When the passage switching valve 20 allows the first main passage 4A to communicate with the bypass passage 4C, the water supplied from the water supplying passage module 5 may be guided to the bypass passage 4C, and may bypass the dispenser 3 to flow to the second main passage 4B.

When the passage switching valve 20 allows the air injection passage 81 to communicate with the dispenser inlet passages 301, 311, 321, and 331, the air injected from the air injection passage module 8 may be guided to the dispenser 3, and may pass through the capsule accommodating parts 31, 32, and 33 to flow to the second main passage 4B.

When the passage switching valve 20 allows the air injection passage 81 to communicate with the bypass passage 4C, the air injected from the air injection passage module 8 may be guided to the bypass passage 4C, and may bypass the dispenser 3 to flow to the second main passage 4B.

A temperature sensor 16 configured to measure the temperature of the fermentation tank 112 may be provided in the fermentation tank 112. The temperature sensor 16 may measure the temperature of the fermentation tank 112, to transmit a temperature value to a control module 280 (see FIG. 3), which will be described below.

The temperature sensor 16 may be fastened to a protrusion 115 protruding downward from the bottom surface of the fermentation tank 112.

FIG. 2 is a perspective view illustrating the beverage maker according to the embodiment of the present disclosure, and FIG. 3 is an exploded perspective view illustrating the beverage maker of FIG. 2.

The beverage maker may include a base 100. The base 100 may constitute the outer appearance of the bottom surface of the beverage maker, and may support the fermentation module 1, the refrigeration cycle device 13, the water supplying heater 53, the water supplying pump 52, a main frame 230, and the like, which are located thereon.

The beverage maker may further include a beverage container 101 that may receive and store the beverage dropped from the beverage discharging valve 62. The beverage container 101 may be formed integrally with the base 100 or may be coupled to the base 100.

The beverage container 101 may include a container body 101A having a space formed therein in which the beverage dropped from the beverage discharging valve 62 is accommodated. The beverage container 101 may include a container top plate 101B arranged on the upper surface of the container body 101A to cover an internal space of the container body 101A.

The container body 101A may protrude forward from a front portion of the base 100. The upper surface of the container body 101A may be opened.

A plurality of holes through which the beverage is dropped into the container body 101A may be formed in the container top plate 101B.

A beverage dropped around a beverage container (not illustrated) among the beverage dropped from the beverage discharging valve 62 may be dropped onto the container top plate 101B, and may be temporarily stored inside the beverage container 101 through a hole of the container top plate 101B, and a vicinity of the beverage maker may be maintained clean.

The fermentation module 1 may have an approximately cylindrical shape. The fermentation module 1 may be supported from the lower side by the base 100.

The fermentation module 1 may be arranged in the base 100. At this time, the fermentation module 1 may be directly seated and arranged in the base 100, and may be supported by a separate fermentation module supporter (not illustrated) seated on the base 100 and be arranged in the base 100.

The fermentation module 1 may include the fermentation tank module 111 having the opening 170 formed therein, and the fermentation lid 107 configured to cover the opening 170. As described above, the beverage making pack 12 may be arranged inside the fermentation tank module 111.

The fermentation tank 112 may be accommodated inside the fermentation case 160. The insulation part 171 may be located between the fermentation tank 112 and the fermentation case 160 to insulate the fermentation tank 112. At this time, the evaporator 134 (see FIG. 1) and/or the heater 14 (see FIG. 1) wound on the fermentation tank 112 may be located between the insulation part 171 and the fermentation tank 112. That is, the insulation part 171 may surround the evaporator 134 and/or the heater 14 together with the fermentation 112, thereby facilitating control of the temperature of the fermentation tank 112.

The fermentation lid 107 may be arranged above the fermentation tank module 111, and may open/close the opening 170 of the fermentation tank module 111 on the upper side thereof.

The fermentation tank module 111 may further include the lid seated body 179 on which the fermentation lid 107 is seated. The lid seated body 179 may be arranged above the fermentation case 160, and may support the fermentation lid 107 on the lower side thereof.

The fermentation case 160 may constitute a partial outer appearance of a lower portion of the fermentation module 1, and the fermentation lid 107 may constitute a partial outer appearance of an upper portion of the fermentation module 1.

The fermentation case 160 may be seated on the base 100.

The fermentation lid 107 may be detachably, slidably, or rotatably connected to the fermentation tank module 111. For example, the fermentation lid 107 may be hinge-connected to the lid seated body 179.

A first hinge connector 109A protruding rearward may be provided in the fermentation lid 107, and the first hinge connector 109A may be hinge-connected to the lid seated body 179.

Meanwhile, the water tank 51 may be arranged above the base 100, and may be spaced apart from the base 100. The water tank 51 may be vertically spaced apart from the base 100 by a water tank supporter 233, which will be described below.

The water tank 51 may be transversely spaced apart from the fermentation module 1. In more detail, the water tank 51 and the fermentation module 1 may be spaced apart from each other in a left-right direction.

The upper surface of the water tank 51 may be opened. The front surface and the rear surface of the water tank 51 may be a transversely rounded curved surface, and opposite surfaces of the water tank 51 may be a flat surface. At this time, a curvature of the front surface and the rear surface of the water tank 51 may be the same as a curvature of an outer circumferential surface of the fermentation module 1.

However, the present disclosure is limited thereto, and the shape of the water tank 51 may change as needed. For example, the upper surface of the water tank 51 may be formed in a top-opened hollow cylindrical shape.

A water tank handle 59 may be provided in the water tank 51. The water tank handle 59 may be rotatably connected to the water tank 51. In more detail, opposite ends of the water tank handle 59 may be hinge-connected to the opposite surfaces of the water tank 51.

In a state in which the water tank handle 59 is rotated upward, the user may lift up the water tank 51 while holding the water tank handle 59.

A stepped part 51*a* may be formed at an upper end of the water tank 51. The stepped part 51*a* may be a portion having a lower height than the other upper end as a part of the upper end of the water tank 51 is stepped. The stepped part 51*a* may be formed as a part of a front portion of the upper end of the water tank 51 is stepped.

The water tank handle 59 may be provided to be in contact with the stepped part 51*a*. At this time, the width of the water tank handle 59 may be the same as the step height of the stepped part 51*a*. Further, the water tank handle 59 may include a bent portion formed to be bent, and the curvature of the bent portion may be the same as the curvature of the front surface of the water tank 51.

The beverage maker may further include a water tank lid 110 covering the opened upper surface of the water tank 51. The water tank lid 110 may open/close an inner space of the water tank 51.

The water tank lid 110 may be rotatably connected to the water tank 51.

A second hinge connector 110A protruding rearward may be provided in the water tank lid 110, and the second hinge connector 110A may be hinge-connected to the water tank 51.

The water tank lid 110 may be formed to have the same shape as that of the lid body 109 of the fermentation lid 107. Accordingly, the beverage maker may have a sense of unity in terms of design, and the same component may be advantageously utilized as the water tank lid 110 and the lid body 109 of the fermentation lid 107.

A height between the base 100 and the lid body 109 of the fermentation lid 107 may be the same as a height between the base 100 and the water tank lid 110. In more detail, a height between the base 100 and the upper surface of the fermentation lid 107 may be the same as a height between the base 100 and the upper surface of the water tank lid 110.

Meanwhile, the beverage maker may further include an outer case 200.

The outer case 200 may be seated on the base 100.

The outer case 200 may define an outer appearance of the beverage maker.

The outer case 200 may include a fermentation module cover 201 covering the fermentation module 1 and a water tank cover 202 covering the water tank 51. The fermentation module cover 201 and the water tank cover 202 may have a hollow cylindrical shape. Parts of the circumferential surfaces of the fermentation module cover 201 and the water tank cover 202 may be opened.

At least parts of the outer circumferences of the fermentation module 1 and the water tank 51 may be surrounded. That is, the fermentation module 1 may be arranged inside the fermentation module cover 201, and the water tank 51 may be arranged inside the water tank cover 202.

The fermentation module cover 201 and the water tank cover 51 may fix the fermentation module 1 and the water tank 51, and may protect the fermentation module 1 and the water tank 51 from external impacts.

The curvature of the fermentation module cover 201 may be the same as that of the outer circumference of the fermentation module 1, and the curvature of the water tank cover 202 may be the same as the curvature of the front surface and the rear surface of the water tank 51.

The height of the fermentation module cover 201 may be larger than the height of the fermentation case 160. It is preferable that the height of the fermentation module cover 201 may be the same as that of the fermentation case 1.

The fermentation module cover 201 and the water tank cover 202 may be transversely spaced apart from each other.

The heights and/or the diameters of the fermentation module cover 201 and the water tank cover 202 may be equal to each other. Accordingly, the outer appearance of the beverage maker may be improved in terms of design because of a symmetric structure and a sense of unity. Detailed configurations of the fermentation module cover 201 and the water tank cover 202 will be described below in detail.

At least one of the main frame 230, the water supplying pump 52, the water supplying heater 53, the air injection pump 82, and the temperature controller 11 may be accommodated in the outer case 200. Also, at least a part of the passage module 2 may be located inside the outer case 200.

The outer case 200 may be configured by coupling a plurality of members. The outer case 200 may include a front cover 210 and a rear cover 220.

The front cover 210 may be arranged in front of the fermentation module 1, the water tank 51, and the main frame 230, and the rear cover 220 may be arranged behind the fermentation module 1, the water tank 51, and the main frame 230.

The front cover 210 may constitute a partial outer appearance of a front portion of the beverage maker.

The beverage discharging valve 62 may be mounted on the front cover 210. The beverage discharging valve 62 may be arranged to be closer to an upper end than a lower end of the front cover 210. The beverage discharging valve 62 may be located above the beverage container 101. The user may discharge the beverage by opening the beverage discharging valve 62.

The front cover 210 may be configured by coupling a plurality of members.

The front cover 210 may include a front fermentation module cover 211, a front water tank cover 212, and a center cover 213.

The front fermentation module cover 211 may cover a part of a front portion of the outer circumference of the fermentation module 1. The front fermentation module cover 211 may correspond to a part of a front portion of the fermentation module cover 201.

The front fermentation module cover 211 may include an upper front fermentation module cover 215 and a lower front fermentation module cover 216.

The upper front fermentation module cover 215 and the lower front fermentation module cover 216 may be formed integrally.

The upper front fermentation module cover 215 may cover a part of a front portion of an outer circumference of the fermentation lid 107, and the lower front fermentation module cover 216 may cover a part of a front portion of an outer circumference of the fermentation case 160.

The circumferential length of the upper front fermentation module cover 215 may be larger than the circumferential length of the lower front fermentation module cover 216.

In more detail, an outer end of the lower front fermentation module cover 216 and an outer end of the upper front fermentation module cover 215 may coincide with each other with respect to the circumferential direction of the front fermentation module cover 211. The outer end of the lower front fermentation module cover 216 and the outer end of the upper front fermentation module cover 215 together may form an outer end 211A of the front fermentation module cover 211.

A front-rear distance between an inner end of the lower front fermentation module cover 216 and the center cover 213 may be smaller than a front-rear distance between an inner end 215B of the upper front fermentation module cover 215 and the center cover 213.

The front fermentation module cover 211 may constitute the fermentation module cover 201 together with a rear fermentation module cover 262 of the rear cover 220. That is, the fermentation module cover 201 may include the front fermentation module cover 211 and the rear fermentation module cover 262. The front fermentation module cover 211 and the rear fermentation module cover 262 may be fastened to each other.

The rear fermentation module cover 262 may cover a part of a rear portion of the fermentation module 1. The rear fermentation module cover 262 may correspond to a part of a rear portion of the fermentation module cover 201. The rear fermentation module cover 262 may be located behind the front fermentation module cover 211.

The rear fermentation module cover 262 may include an upper rear fermentation module cover 266 and a lower rear fermentation module cover 267.

The upper rear fermentation module cover 266 and the lower rear fermentation module cover 267 may be formed integrally.

The upper rear fermentation module cover 266 may cover a part of a rear portion of the outer circumference of the fermentation lid 107, and the lower rear fermentation module cover 267 may cover a part of a rear portion of the outer circumference of the fermentation case 160.

The circumferential length of the upper rear fermentation module cover 266 may be larger than the circumferential length of the lower rear fermentation module cover 267.

An outer end of the lower rear fermentation module cover 267 and an outer end of the upper rear fermentation module cover 266 may coincide with each other with respect to the circumferential direction of the rear fermentation module cover 262. The outer end of the lower rear fermentation module cover 267 and the outer end of the upper rear fermentation module cover 266 together may form an outer end 262A of the rear fermentation module cover 262.

The outer end 262A of the rear fermentation module cover 262 may be in contact with the outer end 211A of the front fermentation module cover 211.

An inner end 262B of the upper rear fermentation module cover 266 may be in contact with an inner end 215B of the upper front fermentation module cover 215. On the other hand, an inner end 267B of the lower rear fermentation module cover 267 may be spaced apart from the inner end of the lower front fermentation module cover 216.

Meanwhile, the front water tank cover 212 may cover the front surface of the water tank 51. The front water tank cover 212 may correspond to a part of a front portion of the water tank cover 202.

The front water tank cover 212 may include an upper front water tank cover 217 and a lower front water tank cover 218.

The upper front water tank cover 217 and the lower front water tank cover 218 may be formed integrally.

The upper front water tank cover 217 may cover a part of an upper portion of the front surface of the water tank 51 and the water tank handle 59. The lower front water tank cover 218 may cover a part of a lower portion of the front surface of the water tank 51.

The circumferential length of the upper front water tank cover 217 may be larger than the circumferential length of the lower front water tank cover 218.

An outer end of the lower front water tank cover 218 and an outer end of the upper front water tank cover 217 may coincide with each other with respect to the circumferential direction of the front water tank cover 212. The outer end of the lower front water tank cover 218 and the outer end of the upper front water tank cover 217 together may form an outer end 212A of the front water tank cover 212.

A front-rear distance between an inner end of the lower front water tank cover 218 and the center cover 213 may be smaller than a front-rear distance between an inner end 217b of the upper front water tank cover 217 and the center cover 213.

The front water tank cover 212 may constitute the water tank cover 202 together with a rear water tank cover 263 of the rear cover 220. That is, the water tank cover 202 may include the front water tank cover 212 and the rear water tank cover 263. The front water tank cover 212 and the rear water tank cover 263 may be fastened to each other.

The rear water tank cover 263 may cover a part of a rear portion of the outer circumference of the water tank 51. The rear water tank cover 263 may be located behind the front water tank cover 212.

The rear water tank cover 263 may include an upper rear water tank cover 268 and a lower rear water tank cover 269.

The upper rear water tank cover 268 and the lower rear water tank cover 269 may be formed integrally.

The upper rear water tank cover 268 may cover a part of an upper portion of the rear surface of the water tank 51, and the lower rear water tank cover 269 may cover a part of a lower portion of the rear surface of the water tank 51.

The circumferential length of the upper rear water tank cover 268 may be larger than the circumferential length of the lower rear water tank cover 269.

An outer end of the lower rear water tank cover 267 and an outer end of the upper rear water tank cover 268 may coincide with each other with respect to the circumferential direction of the rear water tank cover 263. The outer end of the lower rear water tank cover 267 and the outer end of the upper rear water tank cover 268 together may form an outer end 263A of the rear water tank cover 263.

The outer end 263A of the rear water tank cover 263 may be in contact with the outer end 212A of the front water tank cover 212.

An inner end 268B of the upper rear water tank cover 268 may be in contact with an inner end 217B of the upper front water tank cover 217. On the other hand, an inner end of the lower rear water tank cover 269 may be spaced apart from an inner end of the lower front water tank cover 218.

Meanwhile, the center cover 213 may be arranged between the front fermentation module cover 211 and the front water tank cover 212. Opposite ends of the center cover 213 may be in contact with the front fermentation module cover 211 and the front water tank cover 212, respectively.

The center cover 213 may have a vertically arranged flat plate shape.

The height of the center cover 213 may be the same as the heights of the front fermentation module cover 211 and the front water tank cover 212.

A discharge valve mounted part 214 on which the beverage discharging valve 62 is mounted may be formed in the center cover 213.

A valve body 600 of the beverage discharging valve 62 may be mounted on the discharge valve mounted part 214. The discharge valve mounted part 214 may be formed as a part of the front surface of the center cover 213 is recessed rearward.

The discharge valve mounted part 214 may be formed to be closer to an upper end than a lower end of the center cover 213.

A through-hole 214A opened in a front-rear direction may be formed in the discharge valve mounted part 214. The beverage discharging passage 61 may pass through the through-hole 214A and may be connected to the beverage discharging valve 62.

The beverage maker may include a display 282 configured to display various kinds of information of the beverage maker. The display 282 may be arranged in the center cover 213.

It is preferable that the display 282 is formed at a portion of the center cover 213, which is not covered by the beverage discharging valve 62. That is, the display 282 may not transversely overlap with the beverage discharging valve 62.

The display 282 may include a display element such as a liquid crystal display (LCD), a light emitting diode (LED), and an organic light emitting diode (OLED). The display 282 may include a display printed circuit board (PCB) in which the display element is installed. The display PCB may be electrically connected to the control module 280, which will be described below.

The beverage maker may include an input unit configured to receive a command related to manufacturing of the beverage maker.

The input unit may include a rotary knob 283. The rotary knob 283 may be arranged in the center cover 213. The rotary knob 283 may be arranged below the display 282.

Also, the input unit may include a touch screen configured to receive a command of the user in a touch manner. The touch screen may be provided in the display 282.

The input unit may be electrically connected to the control module 280, which will be described below. Also, the user may input the command through a remote controller or a wireless communication device, and it is apparent that the control module 280 may receive the command of the user through a wireless communication element.

Meanwhile, the rear cover 220 may be arranged behind the fermentation module 1, the water tank 51, and the main frame 230.

The rear cover 220 may be coupled to the front cover 210, and an inner space of the outer case 200 may be formed between the rear cover 220 and the front cover 210.

The rear cover 220 may be seated on the base 100, and may have the same height as the front cover 210.

The rear cover 220 may include a first rear cover 260 and a second rear cover 270.

The first rear cover 260 may be seated on the base 100, and the second rear cover 270 may be mounted on the first rear cover 260.

A cover through-hole 264 opened in a front-rear direction may be formed in the first rear cover 260. In more detail, the cover through-hole 264 opened in a front-rear direction may be formed in a cover body 261. The cover through-hole 264 may face the main frame 230 in a front-rear direction.

Accordingly, the user may approach an inside of the beverage maker even while the first rear cover 260 is not separated.

The first rear cover 260 may include the cover body 261, the rear fermentation module cover 262, and the rear water tank cover 263. As described above, the rear fermentation module cover 262 may constitute the fermentation module cover 201 together with the front fermentation module cover 211, and the rear water tank cover 263 may constitute the water tank cover 202 together with the front water tank cover 212.

The rear fermentation module cover 262 and the rear water tank cover 263 may be mounted to be in contact with the cover body 261. At least a part of the cover body 261 may be located behind the rear fermentation module cover 262 and the rear water tank cover 263. The rear fermentation module cover 262 and the rear water tank cover 263 may be mounted on a front side of the cover body 261.

A fermentation module cover seated part formed by rearward recessing a part of the upper surface of the cover body 261 may be provided in the cover body 261. The upper rear fermentation module cover 266 may be seated to be in contact with on an inner circumferential surface of the fermentation module cover seated part.

Also, a water tank cover seated part formed by rearward recessing a part of the upper surface of the cover body 261 may be formed in the cover body 261. The upper rear water tank cover 268 may be seated to be in contact with an inner circumferential surface of the water tank cover seated part.

Hinge connector fitting grooves 262C and 263C may be formed at upper ends of the rear fermentation module cover 262 and the rear water tank cover 263, respectively. The first hinge connector 109A formed in a lid body 109 of the fermentation lid 107 may be fitted in and fixed to the first hinge connector fitting groove 262C formed in the rear fermentation module cover 262. The second hinge connector 110A formed in the water tank lid 110 may be fitted in and fixed to the second hinge connector fitting groove 263C formed in the rear water tank cover 263.

The height of the upper rear fermentation module cover 266 and the upper rear water tank cover 268 may be the same as the height of the dispenser 3.

A pipe accommodating hole 265 may be formed in the rear fermentation module cover 262. The pipe accommodating hole 265 may extend vertically and may be opened in a front-rear direction.

A refrigerant passage connected to the fermentation module 1 and constituting the refrigeration cycle device 13 (see FIG. 1) may be arranged in the cooling pipe 136. In more detail, the refrigerant passage connecting the expansion mechanism 133 and the evaporator 134 (see FIG. 1) may be arranged in the cooling pipe 136.

The cooling pipe 136 may be connected to a rear portion of the fermentation module 1. The cooling pipe 136 may be arranged in the pipe accommodating hole 265 formed in the rear fermentation module cover 262.

The cover body 261 may support the dispenser 3. At least a part of the dispenser 3 may be seated on the upper surface of the cover body 261, and the cover body 261 may support the dispenser 3 on the rear side thereof.

A dispenser outlet passage accommodating groove 261A may be formed in the cover body 261. The dispenser outlet passage accommodating groove 261A may be formed by rearward recessing a part of a front end of an upper portion of the cover body 261.

The dispenser outlet passage module 3B may be connected to a lower portion of the dispenser 3, and may extend to the inner space of the outer case 200 through the dispenser outlet passage accommodating groove 261A.

The second rear cover 270 may be mounted on a rear side of the first rear cover 260. The second rear cover 270 may cover at least a part of the cover through-hole 264 formed in the first rear cover 260.

The second rear cover 270 may be mounted on the cover body 261 of the first rear cover 260. The size of the second rear cover 270 may be larger than the size of the cover body 260. A side surface 274 of the second rear cover 270 may surround a side surface of the cover body 261 from the outside, and an upper surface 277 of the second rear cover 270 may be located above the upper surface of the cover body 261.

At least one through-hole 271 may be formed in the rear cover 220.

In more detail, the at least one through-hole 271 may be formed in the second rear cover 270. The through-hole 271 may face the cover through-hole 265 formed in the first rear cover 260 in a front-rear direction.

The blower fan 135 may be arranged to face the cover through-hole 264 and the through-hole 271 in a front-rear direction, and the condenser 132 may be located between the blower fan 135 and the through-hole 271. Air heat-exchanged in the condenser 132 by the blower fan 135 may sequentially pass through the cover through-hole 264 and the through-hole 271, and may be discharged to the outside of the outer case 200.

Also, gas discharged through the gas discharging valve 73 (see FIG. 1) may be discharged to the outside of the beverage maker through the through hole 271.

At least one of a dispenser cover 272 and a dispenser support 273 may be formed in the second rear cover 270.

The dispenser cover 272 may be formed by rearward recessing a part of the front surface of the second rear cover 270. The dispenser cover 272 may cover the rear surface of the dispenser 3. Accordingly, as compared to a case where the dispenser cover 272 is not recessed, the beverage maker covering the rear surface of the dispenser 3 may become compact in a front-rear direction.

The dispenser support 273 may be formed by downward recessing a part of the upper surface of the second rear cover 270. The height of the dispenser support 273 may be the same as the height of the upper surface of the cover body 261.

A part of a rear portion of the dispenser 3 may be seated on the dispenser support 273, and the dispenser support 273 may support the dispenser 3 on the lower side thereof.

The dispenser cover 272 and the dispenser support 273 may form a dispenser accommodating part together, and the part of the rear portion of the dispenser 3 may be arranged in the dispenser accommodating part. A left-right width of the dispenser cover 272 and the dispenser support 273 may be the same as a left-right width of the dispenser 3.

At least one hinge connector accommodating groove 275 and 276 may be formed in the second rear cover 270. Preferably, a first hinge connector accommodating groove 275 in which the first hinge connector 109A is accommodated and a second hinge connector accommodating groove 276 in which the second hinge connector 110A is accommodated may be formed in the second rear cover 270.

The first hinge connector accommodating groove 275 may correspond to a first hinge connector fixing groove 262C formed in the rear fermentation module cover 262, and the second hinge connector accommodating groove 276 may correspond to a second hinge connector fixing groove 263C formed in the rear water tank cover 263.

Accordingly, as compared to a case where the hinge connector accommodating grooves 275 and 276 are not formed, the beverage maker may become compact in a front-rear direction.

Meanwhile, the dispenser 3 may be arranged between the fermentation module 1 and the water tank 51. Accordingly, the beverage maker may be manufactured more compactly as compared to a case where the dispenser 3 is not located between the fermentation module 1 and the water tank 51, and the dispenser 3 may be protected by the fermentation module 1 and the water tank 51.

The dispenser 3 may have one side which is in contact with the fermentation module 1 and the other side which is in contact with the water tank 51. At least parts of opposite surfaces of the dispenser 3 may be formed in a curved surface, and the curved surface may be in contact with an outer circumference of the fermentation module cover 201 and an outer circumference of the water tank cover 202.

The dispenser 3 may be arranged above the base 100 and may be vertically spaced apart from the base 100. Also, the dispenser 3 may be located above the main frame 230. That is, the main frame 230 may be vertically located between the base 100 and the dispenser 3.

The dispenser 3 may be located between the front cover 210 and the rear cover 220 in a front-rear direction. The front surface of the dispenser 3 may be covered by the center cover 213 of the front cover 210, and the rear surface of the dispenser 3 may be covered by the dispenser cover 272 of the second rear cover 270.

The dispenser 3 may be seated on the rear cover 220. The dispenser 3 may be supported by the cover body 261 of the first rear cover 261 and the dispenser support 273 of the second rear cover 270. At this time, the dispenser outlet passage module 3B connected to the dispenser 3 may be arranged to pass through the dispenser outlet passage accommodating groove 261A of the cover body 261.

The dispenser 3 may include a capsule accommodating body 36 having the capsule accommodating parts 31, 32, and 33 formed therein in which the capsules C1, C2, and C3 are detachably accommodated, and a lid module 37 covering the capsule accommodating parts 31, 32, and 33.

The capsule accommodating body 36 may be supported by the cover body 261 of the first rear cover 261 and the dispenser support 273 of the second rear cover 270.

The lid module 37 may include a lid 38 covering the capsule accommodating body 36. The lid 38 may be slidably arranged in or rotatably connected to the capsule accommodating body 36. The lid 38 may be hinge-connected to the capsule accommodating body 36.

The dispenser 3 may be installed at an approximately central upper portion of the beverage maker, and the user may easily mount and separate the capsules C1, C2, and C3 by upwardly rotating the lid module 37 of the dispenser 3.

Meanwhile, the beverage maker may include the main frame 230 on which at least a part of the passage module 2 is mounted.

The main frame 230 may be located between the front cover 210 and the rear cover 220 in a front-rear direction. At least a part of the main frame 230 may be located behind the fermentation module 1 and the water tank 51.

The main frame 230 may be positioned on the base 100. The main frame 230 may include the water tank supporter 233, and the water tank supporter 233 may space the water tank 51 apart from the base 100 in a vertical direction.

The main frame 230 may be located below the dispenser 3.

At least one of the water supplying pump 52, the water supplying heater 53, the blower fan 135, and the air injection pump 82 may be mounted on the main frame 230. Hereinafter, a case where the blower fan 135 and the air injection pump 82 are mounted on the main frame 230 will be described.

Also, the control module 280 may be mounted on the main frame 230.

At least a part of the main frame 230 may be located between the condenser 132 and the fermentation module 1, and the temperature of the fermentation module 1 may be prevented from increasing due to heat of the condenser 132.

Meanwhile, the compressor 131 may be vertically arranged between the base 100 and the water tank 51.

Also, at least one of the compressor 131, the water supplying heater 53, and the water supplying pump 52 may be transversely arranged between the water tank supporter 233 and the fermentation module 1.

Also, at least one of the water supplying heater 53 and the water supplying pump 52 may be arranged in front of the main frame 230. The condenser 132 may be arranged behind the blower fan 135 mounted on the main frame 230.

The condenser 132 may face the blower fan 135 mounted on the main frame 230. The condenser 132 may be arranged behind the blower fan 135.

Meanwhile, the beverage maker may include the control module 280 configured to control the beverage maker.

The control module 280 may be an electronic device for the beverage maker. The control module 280 may be detachably mounted on the main frame 230.

The control module 280 may include a main PCB and a PCB case 281 in which the main PCB is embedded.

The control module 280 may further include a wireless communication device such as a remote controller or a portable terminal and a wireless communication element performing wireless communication. The wireless communication element may be installed without being limited to types as long as the wireless communication element may wirelessly communicate with the remote controller or the wireless communication device, which is like a Wi-Fi module and a Bluetooth module.

The control module 280 may receive the command input by the input unit. For example, the control module 280 may produce the beverage according to the command input by the rotary knob 283. Also, the control module 280 may output various kinds of information of the beverage maker to the display 282. For example, the control module 280 may display, through the display 282, information on an amount of the discharged beverage, a residual amount of the beverage, and whether the beverage is completely discharged.

The control module 280 may control at least one of the passage module 2, the water supplying pump 52, the water supplying heater 53, the air injection pump 82, and the temperature controller 11.

The control module 280 may be arranged in the main frame 230. The control module 280 may be fastened to a rear portion of the main frame 230.

The PCB case 281 may be fastened to the main frame 230, and may safely protect the main PCB therein.

At least a part of the control module 280 may be arranged to face the cover through-hole 264 formed in the first rear cover 260.

The control module 280 may detect the pressure inside the beverage making pack 12 by the pressure sensor 72, and may detect the temperature of the fermentation tank 112 by the temperature sensor 16. The control module 280 may determine a degree to which the beverage is fermented, using the detected pressure or the detected temperature.

The control module 280 may detect the temperature of the water supplied from the water supplying passage module 5 to the main passage 4 by the thermistor 57, and may control the water supplying heater 53 according to the detected temperature of the water.

The control module 280 may control the temperature controller 1 to maintain the temperature of the fermentation tank 112 at a proper temperature.

The control module 280 may integrate at least one of a time for which the limit switch 630, which will be described below, is switched on, a time for which the air injection pump 82 is driven, and a time for which the main valve 9 is switched on after the beverage is completely produced. The control module 280 may calculate an amount of the beverage discharged from the beverage making pack 12 according to the integrated time. The control module 280 may calculate the residual amount of the beverage based on the calculated amount of the discharged beverage. The control module 280 may determine whether all the beverage in the beverage making pack 12 is discharged, based on information on the calculated residual amount of the beverage. When it is determined that all the beverage in the beverage making pack 12 is discharged, the control module 280 may determine that the beverage is completely discharged.

In addition, the control module 280 may control an overall operation of the beverage maker. This will be described below in detail.

FIG. 4 is a perspective view of a main frame, according to an embodiment of the present disclosure, FIG. 5 is a perspective view of a main frame illustrated in FIG. 4, when viewed in another direction, FIG. 6 is a plan view of a main frame illustrated in FIG. 4, FIG. 7 is a front view when a plurality of components are disposed in the main frame illustrated in FIG. 4, and FIG. 8 is a bottom view when a plurality of components are disposed in the main frame illustrated in FIG. 4.

At least a portion of the passage module 2 may be mounted in the main frame 230. The main frame 230 may be a passage module mounter.

In addition, the main frame 230 may include the air injection pump 82, the blower fan 135, the water supplying pump 52, or the water supplying heater 53 which is mounted therein.

The main frame 230 may include a holder mounting part (not illustrated) mounted therein with a passage holder (not illustrated) that is able to fix each passage or line included in the passage module 2.

The control module 280 may be mounted in the main frame 230.

The main frame 230 may include a frame body 231.

The frame body 231 may be formed in the shape of a box which is open in a bottom surface or rear surface.

The frame body 231 may be disposed vertically.

The frame body 231 may have an opening 244 open in a front-rear direction. The opening 244 may be partially formed in a lower portion of the frame body 231. The opening 244 may be formed beside a blowing fan mounting part 236 to be described below. The opening 244 may be interposed between the blowing fan mounting part 236 and the water tank supporter 233.

At least a portion of the refrigerant passage connecting the compressor 131 with the condenser 132 may be positioned in the opening 244. In other words, the refrigerant passage may connect the compressor 131 with the condenser 132 through the opening 244.

When comparing with the case that the opening 244 is not formed, the space for various parts is increased inside the outer case 200, so the beverage maker is realized in a compact size. In addition, the refrigerant passage connecting the compressor 131 with the condenser 132 may be disposed to pass through the opening 244.

The main frame 230 may include a plane 237A on which the passage module 2 is mounted and curved surfaces 237B and 237C facing the fermentation module 1 and/or the water tank 1.

In more detail, a front surface 237 of the frame body 231 may include the plane 237A and the curved surfaces 237B and 237C. The curved surfaces 237B and 237C may face the fermentation module 1 and the water tank 51.

The plane 237A of the front surface 237 of the frame body 231 may be interposed between the pair of curved surfaces 237B and 237C. The passage module 2 may be mounted on the plane 237A. In more detail, valve mounting parts 240, 241, and 242, on which the opening/closing valves 313, 323, and 333 are mounted, may be formed on the plane 237A.

The first curved surface 237B located at one side of the plane 237A may cover the fermentation module 1 in the front-rear direction, and may be formed with the same curvature as that of the outer circumference of the fermentation module 1, in more detail, the outer circumference of the fermentation case 104. The second curved surface 237C located on an opposite side of the plane 237A may cover the water tank 51 in the front-rear direction, and may be formed with the same curvature as the rear surface of the water tank 51. The beverage maker may be more realized in a compact size in the front-rear direction by the curved surface 237B and 237C.

The opening 244 may be formed under the plane 237A and/or the second curved surface 237C of the front surface 237 of the frame body 231.

The control module 280 may be disposed in the frame body 231. The control module 280 may be disposed inside the frame body 231. The control module 280 may have the control module accommodating space S11 for accommodating the control module 280 therein. The rear surface of the control module accommodating space S11 may be opened, and the control module 280 may be disposed in the control module accommodating space S11 at the rear portion of the frame body 231.

The control module accommodating space S11 may face a cover through-hole 264 formed in the first rear cover 260.

The PCB case 281 of the control module 280 may be fastened to the frame body 231. The PCB case 281 may protect the main PCB therein.

The partition plate 243 may be provided in the frame body 231. The partition plate 243 may be formed to protrude rearward from an inner part of the frame body 231. The partition plate 243 may be horizontally disposed. The partition plate 243 may partition the inner part of the frame body 231 into an upper space for accommodating the control module therein and a lower space positioned under the upper space. In this case, the upper space may include the control module accommodating space S11 in which the control module 280 is received. The lower space may include a condenser accommodating space S12 and a gas discharge space S13 which are to be described below.

The main frame 230 may include the control module accommodating space S11, the condenser accommodating space S12, and the gas discharge space S13. Each of the control module accommodating space S11, the condenser accommodating space S12, and the gas discharge space S13 may be formed to be open in the rear surface thereof.

The partition plate 243 may be interposed between the control module accommodating space S11 and the condenser accommodating space S12. The partition plate 243 may be interposed between the control module accommodating space S11 and the gas discharge space S13.

A barrier 245 may be provided to surround at least a portion of the circumference of the condenser accommodating space S12. The barrier 245 may be interposed between the condenser accommodating space S12 and the control module accommodating space S11. In addition, the barrier 245 may be interposed between the gas discharge space S13 and the condenser accommodating space S12.

The control module accommodating space S11 may be located above the condenser accommodating space S12 and/or the gas discharge space S13, and interposed between the gas discharge space S13 and the condenser accommodating space S12.

At least one of the valve mounting parts 240, 241, and 242 may be mounted in the frame body 231. Each of the valve mounting parts 240, 241, and 242 may be formed on the front surface 237 or the top surface 238 of the frame body 231.

At least a portion of the dispenser inlet passage module 3A may be mounted in the main frame. In more detail, the opening/closing valves 313, 323, and 333 may be mounted on the main frame 230. In more detail, at least opening/closing valve mounting part 240 may be formed on the plane 237A of the front surface 237 of the frame body 231, and each of the opening/closing valves 313, 323, and 333 may be mounted in the opening/closing valve mounting part 240.

The number of the opening/closing valve mounting parts 240 may be equal to the number of the opening/closing valves 313, 323, and 333. The first opening/closing valve 313 may be mounted on the first opening/closing valve mounting part 240A, the second opening/closing valve 323 may be mounted on the second opening/closing mounting part 240B, and the opening/closing valve 333 may be mounted on the third opening/closing mounting part 240C.

The opening/closing valve mounting part 240 may be interposed between the fermentation module contact body 232 and the water tank supporter 233. The fermentation module contact body 232 may be located above the blowing fan mounting part 236.

In addition, at least a portion of an air control passage module 15 may be mounted on the main frame 230. In more detail, at least one of the air supplying opening/closing valve 159 or the air discharging valve 156 may be mounted on the main frame 230. In more detail, at least one of air control valve mounting parts 241 and 242 may be formed on the top surface 238 of the frame body 231, and the air supplying opening/closing valve 159 and/or the air discharging valve 156 may be mounted on the air control valve mounting parts 241 and 242, respectively. The air supplying opening/closing valve 159 may be mounted on the first air control valve mounting part 241 and the air discharging valve 156 may be mounted on the second air control valve mounting part 242.

The first air control valve mounting part 241 may be disposed closer to the water tank supporter 233 of the fermentation module contact body 232 and the water tank supporter 233, and the second air control valve mounting part 242 may be disposed closer to the fermentation module contact body 232 of the fermentation module contact body 232 and the water tank support 233. In other words, the air supplying opening/closing valve 159 and the first air control valve mounting part 241 may be disposed closer to the water tank 51 of the fermentation module 1 and the water tank 51. The discharging valve 156 and the second air control valve mounting part 242 may be disposed closer to the fermentation module 1 of the fermentation module 1 and the water tank 52. Accordingly, when the air discharging valve 156 is turned on and turned off, air may be rapidly discharged from the fermentation tank assembly 111 of the fermentation module 1.

Meanwhile, the main frame 230 may further include the fermentation module contact body 232 making contact with the fermentation module 1.

The fermentation module contact body 232 may be provided on the front surface of the frame body 231. In more detail, the fermentation module contact body 232 may be interposed between the plane 237A and the first curved surface 237B of the front surface 237 of the frame body 231.

The fermentation module contact body 232 may longitudinally extend in the vertical direction. An upper portion of the fermentation module contact body 232 protrudes upward from the top surface 238 of the frame body 231.

The fermentation module contact body 232 may be interposed between an inner side of a lower front fermentation module cover 216 (see FIG. 3) and an inner side 267B of a lower rear fermentation module cover 267 (see FIG. 3), along an outer circumference of the fermentation module 1.

The fermentation module contact body 232 may include a contact part 232A. The contact part 232A may make contact with the outer circumference of the fermentation module 1. The contact part 232A may be formed to be rounded in a horizontal direction, and the curvature of the contact part 232A may be equal to the curvature of the outer circumference of the fermentation module 1. In addition, the curvature of the contact part 232A may be equal to the curvature of the first curved surface 237B. When the fermentation module 1 is mounted, the mounting position of the fermentation module 1 may be determined due to the fermentation module case 201 (see FIG. 2), the first curved surface 237A of the frame body 231, and the contact part 232A of the contact body 232.

The main frame 230 may further include the water tank supporter 233 to support the tank 51.

The water tank supporter 233 may be provided on the front surface 237 of the frame body 231. In more detail, the water tank supporter 233 may be provided on the second curved surface 237C of the front surface 237 of the frame body 231.

The water tank supporter 233 may not overlap the plane 237A of the front surface 237 of the frame body 231 in the front-rear direction.

The water tank supporter 233 may be spaced apart from the fermentation module contact body 232 in the horizontal direction. The fermentation module contact body 232 is disposed closer to one surface of the opposite surfaces 239 of the frame body 231 and the tank supporter 233 may be disposed at another surface of the opposite surfaces of the frame body 231.

The water tank supporter 233 may include a support plate 234 and a reinforcement wall 235.

The support plate 234 may be formed at a position spaced apart from the upper portion of the base 100. The water tank 51 may be mounted on the support plate 234, and the support plate 234 may support the water tank 51 below.

A water supplying hole 234A may be formed in the support plate 234. The water supplying hole 234A may be formed through the support plate 234 in an up-down direction, and a water tank water supplying passage 54 (see FIG. 1) connected with the water tank 51.

At least a portion of the circumferential surface of the support plate 234 may be formed to be rounded. The circumferential surface of the support plate 234 may include an outer surface 234B which is rounded, an inner surface 234C which is a planar surface, and a front surface 234D which is a planar surface.

The outer surface 234B of the support plate 234 may be rounded, and may be formed with the curvature equal to the curvature of the second curved surface 237C of the frame body 231.

Since the inner surface 234C of the support plate 234 is formed to be the planar surface, the space between the water tank supporter 233 and the fermentation module 1 may be widened.

The main frame 230 may include an air injection pump mounting part 234E to which the air injection pump 82 is mounted. In more detail, the air injection pump mounting part 234E may be provided on the front surface 234C of the support plate 234. The air injection pump 82 may be directly mounted to the air injection pump mounting part 234E, or a bracket 82A to which the air injection pump 82 is coupled may be mounted on the air injection pump mounting part 234E.

The compressor 131 may be interposed between the base 100 and the water tank 51. The compressor 131 may be interposed between the support plate 234 and the base 100 in the up-down direction. In other words, the support plate 234 is spaced upward apart from the base 100 to form a space in which the compressor 131 is disposed. Accordingly, when compared to the case that the support plate 234 is not spaced apart from the base 100, the beverage maker may be in the compact size.

The reinforcement wall 235 may formed while extending downward from the support plate 234. In more detail, the reinforcement wall 235 may be formed as a portion of the circumferential surface of the support plate 234 extends while protruding downward. In more detail, the reinforcement wall 235 may be formed as a portion of the outer surface 234B of the circumferential surface of the support plate 234 extend while protruding downward.

The compressor 131 may be interposed between the reinforcement wall 235 and the fermentation module 1 in the horizontal direction.

The reinforcement 235 may make contact with the support plate 234 and the base 100, respectively. A lower end of the reinforcement 235 may be supported by the base 100 while making contact with the base 100. The reinforcement 235 may prevent the support plate 234 from being broken due to the load of the water tank 51 or prevent the support plate 234 from being separated from the frame body 231. In addition, the reinforcement wall 235 surrounds the space between the base 100 and the support plate 234 to protect the compressor 131 disposed in the space.

The reinforcement wall 235 may not overlap the frame body 231 in the front-rear direction. The reinforcement wall 235 may not cover the opening 244 of the frame body 231. The outer surface of the reinforcing wall 235 may be surrounded by the tank cover 202.

The main frame 230 may further include the blowing fan mounting part 236 in which the blowing fan 135 is mounted.

The blowing fan mounting part 236 may be provided in the frame body 231. The blowing fan mounting part 236 may be disposed beside the opening 244 formed in the frame body 231. The blowing fan mounting part 236 may be interposed between the opening 244 and the fermentation module contact body 232 in the horizontal direction.

The blowing fan mounting part 236 may be formed to protrude forward of the frame body 231.

The blowing fan mounting part 236 may be interposed between the water tank supporter 233 and the fermentation module contact body 232 in the horizontal direction. The blowing fan mounting part 236 may be disposed closer to the fermentation module contact body 232 than the water tank supporter 233. One side of the blowing fan mounting portion 236 may make contact with the fermentation module contact body 232.

The blowing fan mounting part 236 may have a mounting hole 236A that is open in the front-rear direction. The blowing fan 135 may be fastened to the front surface of the blowing fan mounting part 236 and may be mounted in the mounting hole 236A.

The blowing fan 135 may be disposed to face the condenser 132 in front of the condenser 132. The blowing fan 135 and the blowing fan mounting part 236 may be interposed between the fermentation module 1 and the compressor 131 in the horizontal direction. In addition, the blowing fan 135 and the blowing fan mounting part 236 may be interposed between the fermentation module 1 and the water tank supporter 233 in the horizontal direction.

The main frame 230 may have the condenser accommodating space S12 in which at least a portion of the condenser 132 (see FIG. 3) is disposed. The condenser accommodating space S12 may be located behind the blowing fan mounting part 236.

The condenser accommodating space S12 may be located under the control module accommodating space S11. The partition plate 243 may be disposed between the condenser accommodating space S12 and the control module accommodating space S11. The partition plate 243 and the barrier 245 to be described later may prevent the temperature of the control module 280 from increasing due to the heat of the condenser 132.

The rear surface of the condenser accommodating space S12 may be open. Accordingly, the heat exchanged by the condenser 132 may be discharged from the cover through-hole 264 of the first rear cover 260 to the through-hole 271 of the second rear cover 270.

The barrier 245 may be provided in the main frame 230.

In more detail, the blower fan mounting part 236 may have the barrier 245, and the barrier 245 may surround at least a portion of the condenser accommodating space S12. The barrier 245 may be an insulating barrier that prevents heat, which is radiated from the condenser 132, from being dispersed to the surroundings.

The barrier 245 may be formed to extend while protruding rearward from the blowing fan mounting part 236. The barrier 245 may be located under the partition plate 243.

The barrier 245 may be an air guide that guides the air blown by the blowing fan 135 such that the air blown by the blowing fan 135 completely passes through the condenser 132 without being dispersed to the surroundings.

The main frame 230 may have a protruding wall 245A.

In more detail, the blowing fan mounting part 236 may include the protruding wall 245A, and the barrier 245 may be disposed at a portion, which is not surrounded by the barrier 245, of the condenser accommodating space S12.

The protruding wall 245A may be formed to protrude rearward from the blowing fan mounting part 236. The front-rear length of the protruding walls 245A may be shorter than the front-rear length of the barrier 245.

The protruding wall 245A may be located between the condenser accommodating space S12 and the opening 244. The protruding wall 245A may serve as a refrigerant passage spacing member to space a refrigerant passage, which connects the compressor 131 with the condenser 132, apart from the blowing fan 135 or the blowing fan mounting part 236, thereby preventing the refrigerant passage from making contact with the blowing fan 15 or the blowing fan mounting part 236.

Alternatively, the protruding wall 245A may serve as a condenser spacing member to space the condenser 132 part from the blowing fan 135 or the blowing fan mounting part 236, thereby prevent condenser 132 from making contact with the blowing fan 135 or the blowing fan mounting part 236.

The blowing fan mounting part 236 may include an auxiliary contact part 236C making contact with the fermentation module 1. The auxiliary contact part 236C may be formed to protrude forward of the blowing fan mounting part 236. The auxiliary contact part 236C may make contact with the fermentation module contact body 232.

The auxiliary contact part 236C may be rounded in the horizontal direction and may be formed with the same curvature as that of the contact part 232A of the fermentation module contact body 232.

Meanwhile, the main frame 230 may include the gas discharge space S13 in which at least a portion of the gas discharge passage module 7 is accommodated. The gas discharge space S13 may be formed in the frame body 231. The gas discharge space S13 may be located under the partition plate 243 and may be separated from the condenser accommodating space S12 by the barrier 245

At least a portion of the gas discharge passage module 7 may be disposed in the gas discharge space S13. For example, the pressure sensor 72 and the gas discharging valve 73 may be disposed in the gas discharge space S13.

The rear surface of the gas discharge space S13 may be open. Accordingly, the gas discharged from the gas discharge passage module 7 may pass through the cover through-hole 264 of the first rear cover 260 to be discharged into the through-hole 271 of the second rear cover 270.

Meanwhile, at least one of valves installed on the main passage 4 may be fixed to the main frame 230. In more detail, at least one of the main valve 9, the bypass valve 35, or the passage switching valve 20 may be fixed to the main frame 230.

The main frame 230 may include a main passage valve mounting part 249 on which at least one of the main valve 9, the bypass valve 35, or the passage switching valve 20 is mounted.

The main passage valve mounting part 249 may include a main bracket 249A. In the main frame 230, at least one of the main valve 9, the bypass valve 35, or the passage switching valve 20 may be coupled to the valve bracket 249A.

The valve bracket 249A may be mounted in the bracket mounting groove 236B formed in the blowing fan mounting part 236. The bracket mounting groove 236B may be formed by recessing a portion of the upper front side of the blowing fan mounting part 236 reward.

FIG. 9 is a sectional view illustrating the beverage discharging valve of the beverage maker, according to an embodiment of the present disclosure.

The beverage discharging valve 62 may include a valve body 600, a lifting valve body 610, a rotary lever 620, and a limit switch 630

The valve body 600 may include a valve passage 611 communicating with the beverage discharging passage 61 (see FIG. 1).

The lifting valve body 610 is discharged such that the lifting valve body 610 is moved up and down in the valve body to open/close the valve body 611

The rotary lever 620 is rotatable linked to the lifting valve body 610 to move up and down the lifting valve body 610 when the rotary lever 620 rotates.

The limit switch 630 may be switched may be switched by the lifting valve body 610.

The beverage discharging valve 62 may further include a valve spring 640 provided in the valve body 600 to elastically press the lifting valve body 610 downward.

The valve body 600 may be mounted in the discharge valve mounted part 214 provided in the center cover 213.

The valve passage 611 may include a horizontal passage 612 longitudinally formed along the valve body 600 and a vertical passage 613 formed to be bent downward from the front end of the horizontal passage 612. The beverage guided into the beverage discharging passage 61 may be dropped to the lower portion of the vertical passage 613 after sequentially passing through the horizontal passage 612 and the vertical passage 613 when the horizontal passage 612 is open. The valve body 600 may include a horizontal part having the horizontal passage 612 formed therein and a vertical part formed perpendicularly to the horizontal part and having a vertical passage 613 formed therein.

The lifting valve body 610 may be disposed on the valve passage 611, especially, the vertical passage 63 such that the lifting valve body 610 is moved up and down. The lifting valve body 610 may be moved down to the height to cover the horizontal passage 612 and moved up to the height to open the horizontal passage 612. The lifting valve body 610 may be disposed such that an upper portion of the lifting valve body 610 protrudes above the valve body 610. An operating protrusion 614 may protrude in the lifting valve body 610 to contract the limit switch 630 when the lifting valve body 610 is moved up.

The rotary lever 620 may be coupled to the upper portion of the lifting valve body 610 through a hinge 621. The rotary lever 620 may be upright in the vertical direction or may be laid down in the horizontal direction in the state that the rotary lever 620 is coupled to the lifting valve body 610.

When the rotary lever 620 is laid down in the horizontal direction, the lifting valve body 610 may be moved up to open the horizontal passage 612, and when the rotary lever 620 is upright in the vertical direction, the lifting valve body 610 may be moved down to close the horizontal passage 612.

The limit switch 630 may be electrically connected to the control module 280, and the control module 280 may control the beverage maker as the limit switch 630 is turned on or off.

The valve spring 640 may be disposed at an upper portion of the vertical part of the valve body 600 to elastically press the lifting valve body 610 downward.

FIG. 10 is a flowchart illustrating a control sequence for the beverage maker according to the embodiment of the present disclosure.

Hereinafter, an operation of the beverage maker according to the present embodiment will be described with reference to FIG. 10 together with FIG. 1.

A method of producing a beverage by the beverage maker according to the present embodiment may include washing and sterilizing steps S100 and S1300 of washing and sterilizing the passages in the beverage maker. The washing and sterilizing steps S100 and S1300 may be progressed separately from a beverage producing course.

It is preferable that the washing and sterilizing steps S100 and S1300 are performed before the beverage producing course is performed and after the beverage producing course is performed.

Also, the washing and sterilizing steps S100 and S1300 may be performed by user's input during the beverage producing course. In this case, like a primary fermenting step or a secondary fermenting step, the washing and sterilizing steps S100 and S1300 may be performed while the main valve 9 is closed and additives are not contained in the material supplier 3.

The washing and sterilizing steps S100 and S1300 may be performed in a state in which the capsules C1, C2, and C3 are not accommodated in the dispenser 3.

On the other hand, the beverage producing course may be performed in a state in which the capsules C1, C2, and C3 are accommodated in the dispenser 3 and the beverage making pack 12 is accommodated in the fermentation tank 112.

The user may input a washing and sterilizing command through the input unit provided in the control module 280, the remote controller, the portable terminal, or the like. The control module 280 may control the beverage maker to perform the washing and sterilizing steps S100 and S1300 according to input of the washing and sterilizing command.

Also, the user may input a beverage producing command through the input unit provided in the control module 280, the remote controller, the portable terminal, or the like. Before and after the beverage producing course is performed according to the input of the beverage producing command, the control module 280 may automatically control the beverage maker to perform the washing and sterilizing steps S100 and S1300.

Hereinafter, the washing and sterilizing step S100 performed before the beverage producing course will be described.

When the beverage discharging valve 62 is closed, the control module 280 may display a message to open the beverage discharging valve 62 on the display 282, and the user may open the beverage discharging valve 62 to switch on the limit switch 630.

When the limit switch 630 of the beverage discharging valve 62 is switched on and the washing and sterilizing command is input through the input unit, the remote controller, the portable terminal, or the like, the control module 280 may switch on the water supplying pump 52 and the water supplying heater 53. Also, the control module 280 may maintain the main valve 9 closed.

The control module 280 may control the passage switching valve 20 to separately or simultaneously wash and sterilize the dispenser 3 and the bypass passage 4C.

For example, the control module 280 may wash and sterilize the bypass passage 4C after washing and sterilizing the dispenser 3.

When the dispenser 3 is washed and sterilized, the control module 280 may control the passage switching valve 20 such that the first main passage 4A and the common dispenser inlet passage 301 communicate with each other, and may switch on the opening/closing valves 313, 323, and 333. When the opening/closing valves 313, 323, and 333 are switched on, the opening/closing valves 313, 323, and 333 may be opened.

When the bypass passage 4C is washed and sterilized, the control module 280 may control the passage switching valve 20 such that the first main passage 4A and the bypass passage 4C communicate with each other, and may switch on the bypass valve 35. When the bypass valve 35 is switched on, the bypass valve 35 may be opened.

When the water supplying pump 52 is switched on, water in the water tank 51 may flow to the water supplying heater 52 and may be heated by the water supplying heater 52.

When the control module 280 controls the passage switching valve 20 such that the first main passage 4A and the common dispenser inlet passage 301 communicate with each other, the water (that is, hot water) heated by the water supplying heater 53 may flow to the first capsule accommodating part 31, the second capsule accommodating part 32, and the third capsule accommodating part 33 through the dispenser inlet passages 311, 321, and 331. The water heated by the water supplying heater 53 may flow to the second main passage 4B after passing through the first capsule accommodating part 31, the second capsule accommodating part 32, and the third capsule accommodating part 33, and may be discharged to the beverage discharging valve 62 through the beverage discharging passage 61.

When the control module 280 controls the passage switching valve 20 such that the first main passage 4A and the bypass passage 4C communicate with each other, the water (that is, the hot water) heated by the water supplying heater 53 may flow to the bypass valve 35 through the bypass passage 4C. The water heated by the water supplying heater 53 may flow to the second main passage 4B after passing through the bypass valve 35, and may be discharged to the beverage discharging valve 62 through the beverage discharging passage 61.

When the control is performed as described above, in the beverage maker, the first main passage 4A, the bypass passage 4C, the bypass valve 35, the capsule accommodating parts 31, 32, and 33, the beverage discharging passage 61, and the beverage discharging valve 62 may be washed and sterilized by the water heated by the water supplying heater 53.

The beverage maker may perform the above-described washing and sterilizing during a washing set time, and may complete the washing and sterilizing process after the washing set time.

After the washing set time elapses, the control module 280 may switch off the water supplying pump 52 and the water supplying heater 53, and may switch off all the bypass valve 35 and the opening/closing valve 313, 323, and 333. When the bypass valve 35 and the opening/closing valves 313, 323, and 333 are switched off, all the bypass valve 35 and the opening/closing valve 313, 323, and 333 may be closed.

Further, the method of producing a beverage by the beverage maker according to the present embodiment may include the beverage producing course of producing a beverage.

Hereinafter, the beverage producing course will be described.

For the beverage producing course, the user may open the fermentation lid 107, insert the beverage making pack 12 into the opening 170, and seat the beverage making pack 12 on the fermentation tank module 111. Thereafter, the user may close the fermentation lid 107, and the beverage making pack 12 may be accommodated and stored in the fermentation tank module 111 and the fermentation lid 107. At this time, an inside of the fermentation tank 112 may be closed by the fermentation lid 107.

Further, before and after the beverage making pack 12 is seated, the user may cover the plurality of capsule accommodating parts 31, 32, and 33 using the lid module 37 after inserting the plurality of capsules C1, C2, and C3 into the dispenser 3.

The user may input the beverage producing command through the input unit connected to the control module 280, the remote controller, the portable terminal, or the like. The control module 280 may control the beverage maker to perform the beverage producing course according to the input of the beverage producing command.

In the beverage producing course, the control module 280 may initiate a water supplying step S200 of supplying water to the beverage making pack 12. The water supplying step S200 may be a liquid malt forming step of forming liquid malt by evenly mixing malt in the beverage making pack 12 with the hot water.

In the water supplying step S200, the control module 280 may switch on the water supplying pump 52 and the water supplying heater 53, and may control the passage switching valve 20 such that the first main passage 4A and the bypass passage 4C communicate with each other. In the water supplying step S200, the control module 280 may switch on the bypass valve 35, and may switch on the main valve 9. The control module 280 may switch on the main valve 9, which is switched off, to open the main valve 9. In the water supplying step S200, the control module 280 may maintain the first opening/closing valve 313, the second opening/closing valve 323, and the third opening/closing valve 333 in an OFF state.

Meanwhile, the control module 280 may switch on the gas discharging valve 73 when the water is supplied to the beverage making pack 12. Further, the control module 280 may switch on the air discharging valve 156 to open the air discharging valve 156.

The water in the water tank 51 may be discharged from the water tank 51 to pass through the water supplying pump 52, may flow to the water supplying heater 53, and may be heated by the water supplying heater 53. The water heated by the water supplying heater 53 may sequentially pass through the first main passage 4A, the passage switching valve 20, and the bypass valve 35, and may pass through the main valve 9 to be introduced into the beverage making pack 12. The hot water introduced into the beverage making pack 12 through the main passage 4 may be mixed with the malt accommodated in the beverage making pack 12, and the malt in the beverage making pack 12 may be mixed with the water, and thus may be gradually diluted. Meanwhile, since the hot water is supplied to the beverage making pack 12, the malt accommodated in the beverage making pack 12 may be quickly and evenly mixed with the hot water.

The beverage making pack 12 may be gradually expanded when the water is introduced as described above, a part of air between the beverage making pack 12 and the fermentation tank 112 may flow to the air supplying passage 154 as the beverage making pack 12 is expanded, and the air flowing to the air supplying passage 154 may be discharged to the air discharging valve 156.

While the water is introduced into the beverage making pack 12, the part of the air filled between the beverage making pack 12 and the fermentation tank 112 may be discharged through the air discharging valve 156, and the beverage making pack 12 may receive the water without being broken or torn inside the fermentation tank 112.

Meanwhile, in water supplying step S200, it is preferable that the water supplying heater 53 heats the water to 50° C. to 70° C., and the control module 280 may control the water supplying heater 53 depending on the temperature detected by the thermistor 57.

The beverage maker may perform the water supplying step S200 until an amount of the water detected by the flow meter 56 arrives at a predetermined amount, and may complete the water supplying step S200 when the amount of the water detected by the flow meter 56 arrives at the predetermined amount.

When water supplying step S200 is completed, the control module 280 may switch off the water supplying pump 52 and the water supplying heater 53, and may switch off the bypass valve 35. When the water supplying step S200 is completed, the control module 280 may switch off the gas discharging valve 73. When the water supplying step S200 is completed, the control module 280 may perform a control to close the air discharging valve 156.

Meanwhile, the beverage maker may perform a control such that the air is introduced into the beverage making pack 12 during the water supplying step S200.

The control module 280 may primarily introduce the water into the beverage making pack 12, and then terminate the introduction. Thereafter, the control module 280 may inject the air into the beverage making pack 12, and then terminate the injection. Finally, the control module 280 may secondarily introduce the hot water into the beverage making pack 12, and then terminate the introduction. Further, after all the primary water introduction, the air injection, and the secondary water introduction are completed, the water supplying step S200 may be completed.

As a first example of the water supplying step S200, only a hot water supplying process of supplying the hot water may be performed.

As a second example of the water supplying step S200, a primary hot water supplying process of primarily supplying the hot water, an air injecting process of injecting the air, and a secondary hot water supplying process of secondarily supplying the hot water may be sequentially performed.

First, as the first example of the water supplying step S200, a case where in the water supplying step S200, only the hot water supplying process is performed will be described below.

When the hot water supplying process is initiated, the control module 280 may switch on the water supplying pump 52 and the water supplying heater 53, and may control the passage switching valve 20 such that the first main passage 4A and the bypass passage 4C communicate with each other. Also, when the hot water supplying process is initiated, the control module 280 may switch on the bypass valve 35, and may switch on the main valve 9. When the hot water supplying process is initiated, the control module 280 may switch on the gas discharging valve 73. When the hot water supplying process is initiated, the control module 280 may switch on the air discharging valve 156.

Further, when the hot water supplying process is completed, the control module 280 may switch off the water supplying pump 52 and the water supplying heater 53, and may switch off the bypass valve 35. When the hot water supplying process is completed, the control module 280 may switch off the gas discharging valve 73. When the hot water supplying process is completed, the control module 280 may switch off the air discharging valve 156.

Hereinafter, as the second example of the water supplying step S200, a case where in the water supplying step S200, the primary hot water supplying process, the air injecting process, and the secondary hot water supplying process are sequentially performed will be described.

When the primary hot water supplying process is initiated, the control module 280 may switch on the water supplying pump 52 and the water supplying heater 53, and may control the passage switching valve 20 such that the first main passage 4A and the bypass passage 4C communicate with each other. Also, when the primary hot water supplying process is initiated, the control module 280 may switch on the bypass valve 35, and may switch on the main valve 9. When the primary hot water supplying process is initiated, the control module 280 may switch on the gas discharging valve 73. When the primary hot water supplying process is initiated, the control module 280 may switch on the air discharging valve 156.

Further, when the primary hot water supplying process is completed, the control module 280 may switch off the water supplying pump 52 and the water supplying heater 53. When the primary hot water supplying process is completed, the control module 280 may maintain the bypass valve 35 and the main valve 9 in an ON state. When the primary hot water supplying process is completed, the control module 280 may maintain the gas discharging valve 73 in an ON state. When the primary hot water supplying process is completed, the control module 280 may maintain the air discharging valve 156 in an ON state. In the primary hot water supplying process, the water may be introduced into the beverage making pack 12, the beverage making pack 12 may be expanded by the introduced water, and the part of the air between the beverage making pack 12 and the fermentation tank 112 may be pushed by the expanded beverage making pack 12 to flow to the air supplying passage 154, and may be discharged to the outside through the air discharging valve 156.

When the air injecting process is initiated, the control module 280 may switch on the air injection pump 82. Also, when the air injection process is initiated, the control module 280 may control the passage switching valve 20 such that the air injection passage 81 and the bypass passage 4C communicate with each other, and may perform a control to close the air supplying opening/closing valve 159.

While the air injection pump 82 is switched on, the air pumped by the air injection pump 82 may be introduced into the bypass passage 4C through the air injection passage 81, and may be introduced into the beverage making pack 12 through the main valve 9. In this way, the air introduced into the beverage making pack 12 may collide with the liquid malt to help to more evenly mix the malt with the hot water.

As the air is introduced into the beverage making pack 12, the beverage making pack 12 may be expanded, and the part of the air between the beverage making pack 12 and the fermentation tank 112 may be pushed by the expanded beverage making pack 12 to flow to the air supplying passage 154, and may be discharged to the outside through the air discharging valve 156.

When a pressure detected by the pressure sensor 72 is not less than a predetermined pressure, the control module 280 may complete the air injection process, and may switch off the air injection pump 82 for the completion of the air injection process. When the air injection process is completed, the control module 280 may maintain the main valve 9, the bypass valve 35, the gas discharging valve 73, and the air discharging valve 156 in an ON state.

when the secondary hot water supplying process is initiated, the control module 280 may switch on the water supplying pump 52 and the water supplying heater 53. Also, when the secondary hot water supplying process is initiated, the control module 280 may control the passage switching valve 20 such that the first main passage 4A and the bypass passage 4C communicate with each other.

Similar to the primary hot water supplying process, the water in the water tank 51 may be supplied to the beverage making pack 12, and new hot water may be additionally supplied to the beverage making pack 12.

In the above-described secondary hot water supplying process, the beverage making pack 12 may be further expanded by the additionally introduced water, and the part of the air remaining between the beverage making pack 12 and the fermentation tank 112 may be pushed by the expanded beverage making pack 12 to flow to the air supplying passage 154, and may be discharged to the outside through the air discharging valve 156.

The control module 280 may determine whether the secondary hot water supplying process is completed, depending on a flow rate detected by the flow meter 56 during the secondary hot water supplying process. When the flow rate detected by the flow meter 56 arrives at a predetermined flow rate during the secondary hot water supplying process, the control module 280 may determine that the secondary hot water supplying process is completed, may switch off the water supplying pump 52 and the water supplying heater 53, and may switch off the main valve 9, the bypass valve 35, and the gas discharging valve 73.

Further, the control module 280 may perform a control to switch off and close the air discharging valve 156 such that the air in the fermentation tank 112 is not discharged through the air discharging valve 156.

Meanwhile, when the water supplying step S200 is completed, the beverage maker may perform a fermentation tank cooling step S300 of cooling the fermentation tank 112.

The control module 280 may control the temperature controller 11 to cool the fermentation tank 112. In more detail, the control module 280 may control the compressor 131 and the expansion mechanism 133 of the refrigeration cycle device 13 to cool the fermentation tank 112. The refrigerant compressed by the compressor 131 may be condensed by the condenser 132 and then may be expanded by the expansion mechanism 133. The refrigerant expanded by the expansion mechanism 133 may steal heat of the fermentation tank 112 while passing through the evaporator 134, and may be evaporated. The refrigerant passing through the evaporator 134 may be suctioned into the compressor 131. When the compressor 131 is driven, the fermentation tank 112 may be gradually cooled, and the beverage making pack 12 accommodated in the fermentation tank 112 and the liquid malt accommodated in the beverage making pack 12 may be cooled.

When the fermentation tank 112 is cooled as described above, the beverage maker may cool the beverage making pack 12 to a middle temperature, for example, 23 to 27, and the control module 280 may control the compressor 131 depending on the temperature detected by the temperature sensor 16 installed in the fermentation tank 112. The control module 280 may switch on the compressor 131 when the temperature detected by the temperature sensor 16 exceeds a compressor-on temperature. The control module 280 may switch off the compressor 131 when the temperature detected by the temperature sensor 16 is not more than a compressor-off temperature.

During the fermentation tank cooling step S300, the control module 280 may maintain the air discharging valve 156 closed, the air between the beverage making pack 12 and the fermentation tank 112 is not discharged to the outside through the air discharging valve 156, and the air in the fermentation tank 112 may be quickly cooled.

Exceptionally, when the temperature of the beverage making pack 12 is lower than the middle temperature since the external temperature is very low, the control module 280 may switch on the heater 14 wound on the fermentation tank 112. The control module 280 may switch on the heater 14 when the temperature detected by the temperature sensor 16 is smaller than a heater-on temperature. The control module 280 may switch off the heater 14 when the temperature detected by the temperature sensor 16 is not less than a heater-off temperature.

After the fermentation tank cooling step S300 is initiated and the compressor 131 is switched on as described above, when the temperature detected by the temperature sensor 16 is not more than the compressor-off temperature at least one time, the beverage maker may perform a mixing step S400 of mixing the liquid malt by supplying the air into the beverage making pack 12. Alternatively, after the fermentation tank cooling step S300 is initiated and the heater 14 is switched on as described above, when the temperature detected by the temperature sensor 16 is not less than the heater-off temperature at least one time, the beverage maker may perform the mixing step S400 of mixing the liquid malt by supplying the air into the beverage making pack 12.

Even during the mixing step S400, the beverage maker may perform a control to switch on/off the compressor 131 and the heater 14 depending on the temperature detected by the temperature sensor 16, and the ON/OFF control of the compressor 131 and the heater 14 may continue until additive inputting steps S500, S600, and S700 are completed.

In the mixing step S400, the control module 280 may switch on the air injection pump 82 and switch off the air supplying opening/closing valve 159, and may control the passage switching valve 20 such that the air injection passage 81 and the bypass passage 4C communicate with each other. Also, the control module 280 may switch on the bypass valve 35, the main valve 9, and the gas discharging valve 73. The control module 280 may perform a control to open the air discharging valve 156.

While the air injection pump 82 is switched on, the air pumped by the air injection pump 82 may be introduced into the bypass passage 4C through the air injection passage 81, and then may be introduced into the beverage making pack 12 through the second main passage 4B and the main valve 9. In this way, the air introduced into the beverage making pack 12 may collide with the liquid malt to help to evenly mix the malt and the water with each other, and the air colliding with the liquid malt may supply oxygen to the liquid malt.

While the air is injected into the beverage making pack 12, the beverage making pack 12 may be expanded by the air injected into the beverage making pack 12. The part of the air between the beverage making pack 12 and the fermentation tank 112 may be pushed by the expanded beverage making pack 12 to flow to the air supplying passage 154, and may be discharged to the outside through the air discharging valve 156.

As the part of the air between the beverage making pack 12 and the fermentation tank 112 is discharged through the air supplying passage 154 and the air discharging valve 156, the beverage making pack 12 may be easily expanded, and the air of the main passage 4 may be promptly introduced into the beverage making pack 12 and may be mixed with the liquid malt.

The control module 280 may mix the air with the liquid malt during a predetermined mixing time (for example, one hour) after the air injection pump 82 is switched on, may switch off the air injection pump 82 when the air injection pump 82 is switched on and the predetermined mixing time elapses, and may switch off the bypass valve 35 and the gas discharging valve 73. When the air injection pump 82 is switched off, the control module 280 may perform a control to close the air discharging valve 156. That is, when the predetermined mixing time elapses, the beverage maker may complete the mixing step S400.

The beverage maker may perform the additive inputting steps S500, S600, and S700 after the mixing step S400.

In the additive inputting steps S500, S600, and S700, the beverage maker may simultaneously or sequentially input the additive of the first capsule C1, the additive of the second capsule C2, and the additive of the third capsule C3.

The control module 280 may sequentially perform an additive inputting process S500 for the first capsule C1, an additive inputting process S600 for a second capsule C2, and an additive inputting process S700 for the third capsule C3.

In the additive inputting steps S500, S600, and S700, the control module 280 may control the passage switching valve 20 such that the first main passage 4A and the common dispenser inlet passage 301 communicate with each other.

In the additive inputting process S500 for the first capsule C1, the control module 280 may switch on the water supplying pump 52, the main valve 9, the first opening/closing valve 313, and the gas discharging valve 73 during a first additive setting time. When the water supplying pump 52 is switched on, the water in the water tank 51 may pass through the water supplying pump 52, may pass through the water supplying heater 53, and then may be introduced into the first capsule C1. The water introduced into the first capsule C1 may be mixed with the additive accommodated in the first capsule C1, may flow to the second main passage 4B together with the additive accommodated in the first capsule C1, and may be introduced into the beverage making pack 12 through the second main passage 4B. When the first additive setting time elapses, the control module 280 may switch off the water supplying pump 52 and the first opening/closing valve 313, and may complete the additive inputting process S500 for the first capsule C1.

In the additive inputting process S600 for the second capsule C2, the control module 280 may switch on the water supplying pump 52 and the second opening/closing valve 323 during a second additive setting time. When the water supplying pump 52 is switched on, the water in the water tank 51 may pass through the water supplying pump 52, may pass through the water supplying heater 53, and then may be introduced into the second capsule C2. The water introduced into the second capsule C2 may be mixed with the additive accommodated in the second capsule C2, may flow to the second main passage 4B together with the additive accommodated in the second capsule C2, and may be introduced into the beverage making pack 12 through the second main passage 4B. When the second additive setting time elapses, the control module 280 may switch off the water supplying pump 52 and the second opening/closing valve 323, and may complete the additive inputting process S600 for the second capsule C2.

In the additive inputting process S700 for the third capsule C3, the control module 280 may switch on the water supplying pump 52 and the third opening/closing valve 333 during a third additive setting time. When the water supplying pump 52 is switched on, the water in the water tank 51 may pass through the water supplying pump 52, may pass through the water supplying heater 53, and then may be introduced into the third capsule C3. The water introduced into the third capsule C3 may be mixed with the additive accommodated in the third capsule C3, may flow to the second main passage 4B together with the additive accommodated in the third capsule C3, and may be introduced into the beverage making pack 12 through the second main passage 4B. When the third additive setting time elapses, the control module 280 may switch off the water supplying pump 52 and the third opening/closing valve 333, and may complete the additive inputting process S700 for the third capsule C3.

When all the additive inputting steps S500, S600, and S700 are completed, a dispenser residual water removing step S800 of removing residual water in the dispenser 3 may be performed.

In the dispenser residual water removing step S800, the control module 280 may switch on the air injection pump 82 and switch off the air supplying opening/closing valve 159, and may control the passage switching valve 20 such that the air injection passage 81 and the common dispenser inlet passage 301 communicate with each other. Also, in the dispenser residual water removing step S800, the control module 280 may switch on the first opening/closing valve 313, the second opening/closing valve 323, and the third opening/closing valve 333, and may switch on the main valve 9, and the gas discharging valve 73.

When the air injection pump 82 is switched on, the air may sequentially pass through the air injection passage 81 and the common dispenser inlet passage 301, may be supplied to the first capsule accommodating part 31, the second capsule accommodating part 32, and the third capsule accommodating part 33, and then may blow residual water remaining in the first capsule accommodating part 31, the second capsule accommodating part 32, and the third capsule accommodating part 33 to the second main passage 4B. The air may be moved to the beverage making pack 12 together with the residual water moved to the first capsule accommodating part 31, the second capsule accommodating part 32, and the third capsule accommodating part 33. In the dispenser residual water removing step S800, a controller 109 may open the air discharging valve 156.

As the air is introduced into the beverage making pack 12, the beverage making pack 12 may be further expanded, and the part of the air between the beverage making pack 12 and the fermentation tank 112 may be pushed by the expanded beverage making pack 12 to flow to the air supplying passage 154, and may be discharged to the outside through the air discharging valve 156.

As the part of the air between the beverage making pack 12 and the fermentation tank 112 is discharged through the air supplying passage 154 and the air discharging valve 156, the beverage making pack 12 may be easily expanded, and the air and the residual water of the main passage 4 may be promptly introduced into the beverage making pack 12.

The control module 280 may switch on the air injection pump 82 during a residual water removal setting time, and may switch off the air injection pump 82 and switch off the first opening/closing valve 313, the second opening/closing valve 323, the third opening/closing valve 333, the main valve 9, and the gas discharging valve 73 when the residual water removal setting time elapses. Also, the control module 280 may perform a control to close the air discharging valve 156.

The beverage maker may complete the dispenser residual water removing step S800 when the residual water removal setting time elapses.

When the dispenser residual water removing step S800 is completed, the control module 280 may display a capsule separating message indicating that the capsules C1, C2, and C3 may be removed from the display 282, and the user may remove empty capsules from the dispenser 3.

After the dispenser residual water removing step S800 is completed, the beverage maker may sequentially perform a primary fermenting step S900 and a secondary fermenting step S1000.

In the primary fermenting step S900, the control module 280 may control the compressor 131 and the heater 14 to a primary fermentation target temperature, and may control the compressor 131 and the heater 14 such that the temperature detected by the temperature sensor 16 is maintained in a primary fermentation setting temperature range. After the primary fermenting step S900 is initiated, the control module 280 may periodically switch on and then switch off the gas discharging valve 73, and may store the pressure detected by the pressure sensor 72 in a storage unit (not illustrated) while the gas discharging valve 73 is switched on. When a change in the pressure periodically detected by the pressure sensor 72 exceeds a first fermentation setting pressure, the control module 280 may determine that primary fermentation is completed, and may complete the primary fermenting step S900.

After the primary fermenting step S900 is completed, the control module 280 may initiate the secondary fermenting step S1000. In the secondary fermenting step S1000, the control module 280 may control the compressor 131 and the heater 14 to a secondary fermentation target temperature, and may control the compressor 131 and the heater 14 such that the temperature detected by the temperature sensor 16 is maintained in a secondary fermentation setting temperature range. After the secondary fermenting step S1000 is initiated, the control module 280 may periodically switch on and then switch off the gas discharging valve 73, and may store the pressure detected by the pressure sensor 72 in the storage unit (not illustrated) while the gas discharging valve 73 is switched on. When the change in the pressure periodically detected by the pressure sensor 72 exceeds a second fermentation setting pressure, the control module 280 may determine that secondary fermentation is completed, and may complete the secondary fermenting step S1000.

When both the primary fermenting step S900 and the secondary fermenting step S1000 are completed, the beverage maker may perform a maturing step S1100.

In the maturing step S1100, the control module 280 may stand by during a mature time, and may control the compressor 131 and the heater 14 such that the temperature of the beverage is maintained between an upper limit of a setting mature temperature and a lower limit of the setting mature temperature during the mature time.

Since the beverage maker is generally used indoors, it is general that the temperature of the outside of the beverage maker is between the upper limit of the setting mature temperature and the lower limit of the setting mature temperature or is higher than the upper limit of the setting mature temperature. In this case, the control module 280 may switch off the compressor 131 when the temperature detected by the temperature sensor 16 is not more than the lower limit of the setting mature temperature, and may switch on the compressor 131 when the temperature detected by the temperature sensor 16 is not less than the upper limit of the setting mature temperature.

Exceptionally, when the temperature of the outside of the beverage maker is lower than the lower limit of the setting mature temperature, the control module 280 may switch on the heater 14 when the temperature detected by the temperature sensor 16 is lower than the lower limit of the setting mature temperature, and may switch off the heater 14 when the temperature detected by the temperature sensor 16 is not less than the upper limit of the setting mature temperature.

In the beverage maker, when the mature time elapses, the beverage may be completely produced.

The control module 280 may display completed production of the beverage through the display 282, and the like.

Also, the control module 280 may control the compressor 131 such that the temperature of the fermentation tank 112 is maintained between an upper limit and a lower limit of a predetermined beverage temperature. The control module 280 may switch on the compressor 131 when the temperature detected by the temperature sensor 16 is not less than the upper limit of the beverage temperature, and may switch off the compressor 131 when the temperature detected by the temperature sensor 16 is lower than the lower limit of the beverage temperature. Accordingly, the beverage maker may always provide a cool beverage to the user.

The control module 280 may maintain the temperature of the fermentation tank 112 between the upper limit and the lower limit of the predetermined beverage temperature until a beverage discharging step S1200 is completed.

In the beverage discharging step S1200, the user may manipulate the beverage discharging valve 62 to discharge the beverage.

When the user manipulates the beverage discharging valve 62 in an opened direction, the limit switch 630 may be contacted, and since the beverage is completely produced, the control module 280 may open the main valve 9.

When the main valve 9 is opened, the beverage in the beverage making pack 12 may flow from the beverage making pack 12 to the main passage 4 due to the pressure of the air between the beverage making pack 12 and the fermentation tank 112, and may flow from the main passage 4 to the beverage discharging passage 61 to be discharged to the dispenser 62.

When the user manipulates the beverage discharging valve 62 in a closed direction after discharging a part of the beverage through the beverage discharging valve 62, the limit switch 630 may be uncontacted, and the control module 280 may close the main valve 9.

Thereafter, the control module 280 may perform a control to switch on the air injection pump 82, and to switch on and open the air supplying opening/closing valve 159. At this time, the air discharging valve 156 may be maintained closed.

When the air injection pump 82 is switched on, the air may sequentially pass through the air injection passage 81 and the air supplying passage 154 to be supplied to between the beverage making pack 12 and the fermentation tank 112, and the air between the beverage making pack 12 and the fermentation tank 112 may press the beverage making pack 12 by the pressure by which the beverage in the beverage making pack 12 may be raised to the second main passage 4B. This is for forming a sufficiently high pressure between the beverage making pack 12 and the fermentation tank 112 such that the beverage in the beverage making pack 12 is promptly discharged when the beverage is discharged at a next time.

The user may discharge the beverage through the beverage discharging valve 62 at least one time, and the control module 280 may determine whether the beverage is completely discharged using information on a time when the limit switch 630 is switched on, a time when an air pump 152 is driven, a time when the main valve 9 is switched on after the beverage is completely produced, and the like.

When the beverage is completely discharged, the control module 280 may perform a control to close the air supplying opening/closing valve 159, and to open the air discharging valve 156.

When the beverage is completely discharged, and the beverage discharging valve 62 is closed, the control module 280 switches on and opens the air discharging valve 156 during a completion setting time.

When the control is performed such that the air discharging valve 156 is opened, the air between the beverage making pack 12 and the fermentation tank 112 may be discharged to the air discharging valve 156 through the air supplying passage 154, and a pressure between the beverage making pack 12 and the fermentation tank 112 may be equal to the atmospheric pressure.

After the air discharging valve 156 is switched on, when the completion setting time elapses, the control module 280 switches off and closes the air discharging valve 156.

After the beverage is discharged, when the washing and sterilizing step S1300 is not performed or the washing and sterilizing step S1300 does not include a main passage washing process, the control module 280 may display, on the display 282, a pack removing message to remove the beverage making pack 12. The user may open the fermentation lid 107 to remove the beverage making pack 12 from the fermentation tank module 111.

When the fermentation lid 107 is opened, if the pressure inside the fermentation tank 112 is a high pressure that is larger than the atmospheric pressure by a predetermined pressure, the beverage making pack 12 may bounce to the upper side of the fermentation tank 112 due to such a pressure difference.

On the other hand, when the part of the air between the beverage making pack 12 and the fermentation tank 112 is discharged through the air discharging valve 156 before the user opens the fermentation lid 107, if the fermentation lid 107 is opened, the beverage making pack 12 does not bounce to the upper side, and is maintained inside the fermentation tank 112.

That is, the user may withdraw the safely, cleanly, and previously used beverage making pack 12 from the fermentation tank 112.

Meanwhile, when all the beverage in the beverage making pack 12 is discharged, and the control module 280 determines that the beverage is completely discharged, the control module 280 may further perform the washing and sterilizing step S1300 after the beverage producing course and the discharge of the beverage.

The washing and sterilizing step S1300 after the beverage producing course and the discharge of the beverage may include at least one of a discharging valve washing process and the main passage washing process. When the washing and sterilizing step S1300 includes the discharging valve washing process and the main passage washing process, sequences of performing the washing processes may change as needed.

Since the discharging valve washing process is equal or similar to the above-described washing and the sterilizing step S100 before the beverage producing course, duplicate contents will be omitted. Hereinafter, the main valve washing process will be described.

When the limit switch 630 of the beverage discharging valve 62 is switched off, the control module 280 may switch on the water supplying pump 52 and the water supplying heater 53. Also, the control module 280 may open the main valve 9.

When the main passage washing process is initiated, the control module 280 may switch on the gas discharging valve 73. When the main passage washing process is initiated, the control module 280 may switch on the air discharging valve 156.

The control module 280 may control the passage switching valve 20 to separately or simultaneously wash and sterilize the dispenser 3 and the bypass passage 4C.

For example, the control module 280 may wash and sterilize the bypass passage 4C after washing and sterilizing the dispenser 3.

When the dispenser 3 is washed and sterilized, the control module 280 may control the passage switching valve 20 such that the first main passage 4A and the common dispenser inlet passage 301 communicate with each other, and may switch on the opening/closing valves 313, 323, and 333. When the opening/closing valves 313, 323, and 333 are switched on, the opening/closing valves 313, 323, and 333 may be opened.

When the bypass passage 4C is washed and sterilized, the control module 280 may control the passage switching valve 20 such that the first main passage 4A and the bypass passage 4C communicate with each other, and may switch on the bypass valve 35. When the bypass valve 35 is switched on, the bypass valve 35 may be opened.

When the water supplying pump 52 is switched on, water in the water tank 51 may flow to the water supplying heater 52 and may be heated by the water supplying heater 52.

When the control module 280 controls the passage switching valve 20 such that the first main passage 4A and the common dispenser inlet passage 301 communicate with each other, the water (that is, hot water) heated by the water supplying heater 53 may flow to the first capsule accommodating part 31, the second capsule accommodating part 32, and the third capsule accommodating part 33 through the dispenser inlet passages 311, 321, and 331. The water heated by the water supplying heater 53 may flow to the second main passage 4B after passing through the first capsule accommodating part 31, the second capsule accommodating part 32, and the third capsule accommodating part 33, and may be introduced into the empty beverage making pack 12 inside the fermentation tank 112 through the main passage connector 115.

When the control module 280 controls the passage switching valve 20 such that the first main passage 4A and the bypass passage 4C communicate with each other, the water (that is, the hot water) heated by the water supplying heater 53 may flow to the bypass valve 35 through the bypass passage 4C. The water heated by the water supplying heater 53 may flow to the second main passage 4B after passing through the bypass valve 35, and may be introduced into the empty beverage making pack 12 inside the fermentation tank 112 through the main passage connector 115.

In the main passage washing process, the water performing the washing and sterilizing may be introduced into the beverage making pack 12 emptied after the beverage is completely discharged, the beverage making pack 12 may be expanded by the introduced water, and the part of the air between the beverage making pack 12 and the fermentation tank 112 may be pushed by the expanded beverage making pack 12 to flow to the air supplying passage 154, and may be discharged to the outside through the air discharging valve 156.

When the control is performed as described above, in the beverage maker, the first main passage 4A, the bypass passage 4C, the bypass valve 35, the capsule accommodating parts 31, 32, and 33, the second main passage 4B, and the main passage connector 115 may be washed and sterilized by the water heated by the water supplying heater 53.

The beverage maker may perform the above-described washing and sterilizing during a main passage washing set time, and may complete the main passage washing process after the main passage washing set time.

The control module 280 may switch off the water supplying pump 52 and the water supplying heater 53 after the main passage washing set time elapses, and may close all the main valve 9, the bypass valve 35, the opening/closing valve 313, 323, and 333, the gas discharging valve 73, and the air discharging valve 156.

After the washing and sterilizing step S1300 is completed, the user may open the fermentation lid 107, and may withdraw the beverage making pack 12 containing the water performing the washing from the fermentation tank module 111.

FIG. 11 is a view illustrating the configuration of the beverage maker according to another embodiment of the present disclosure.

The description of the beverage maker of the present embodiment is the same as the previous description except for a sub-valve 64. Accordingly, the duplication description will be omitted and the following description will be made while focusing on the difference from the previous embodiment.

The beverage discharging passage module 6 may further include the sub-valve 64 to open or close the beverage discharging passage 61. The sub-valve 64 may be mounted on the beverage discharging passage 61.

The sub-valve 64 may be open when the beverage is dispensed, and the sub valve 64 may be closed when the beverage is not dispensed.

When the beverage is dispensed, the sub-valve 64 may be synchronized with the beer discharging valve 62 in an open/close operation. In more detail, when the user opens the beer discharging valve 62, the limit switch 630 is turned on, and the control module 280 may open the sub-valve 64 when the limit switch 630 is turned on. When a user closes the beer discharging valve 62, the limit switch 630 is turned off, and the control module 280 may close the sub-valve 64 when the limit switch 630 is turned off.

At least one of the main valve 9 or the sub-valve 64 may be mounted on the main frame 230.

When water, air, or the mixture of water and air is introduced into the fermentation module 1 along the main passage 4, the control module 280 may open the main valve 9 and close the sub-valve 64.

When a beverage is discharged along the main passage 4 from the fermentation module 1, the control module 280 may close the main valve 9. When the beverage discharging valve 62 is open, so the limit switch 630 is turned on, the control module 280 may turn off the sub-valve 64. When the beverage discharging valve 62 is closed, so the limit switch 630 is turned off, the control module 280 may close the sub-valve 64.

Due to the configuration, the main valve 9 is closed and the sub-valve 64 is open in the beverage discharging step S1200, the beverage discharged to the main passage 4 from the fermentation module 1 may be guided to the beverage discharging passage 61. The user opens the beverage discharging valve 62 to discharge the beverage.

FIG. 12 is a view illustrating the configuration of the beverage maker according to still another embodiment of the present disclosure.

The description of the beverage maker of the present embodiment is the same as the previous description except for the connection relationship between the beverage discharging passage module 6 and the main passage 4. Accordingly, the duplication description will be omitted and the following description will be made while focusing on the difference from the previous embodiment.

The beverage discharging passage module 6 may be connected between the main valve 9 of the main passage 4 and the fermentation module 1.

In more detail, the beverage discharging passage 61 may be connected between the main valve 9 of the second main passage 4B and a main passage connection part 115 formed in the fermentation module 1. In other words, the first connection part 91' of the main passage 4 may be connected between the man valve 9 and the second connection part 92.

Accordingly, the water, the air, or the mixture of the water or the air introduced into the fermentation module 1 passes through the main valve 9, and the beverage discharged from the fermentation module 1 may pass through the sub-valve 64. In other words, according to the present embodiment, the main valve 9 does not work as a bidirectional valve work and may work as one-direction valve, which is different from the description of the previous embodiment.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the embodiments of the present disclosure are provided to explain the spirit and scope of the present disclosure, but not to limit them, so that the spirit and scope of the present disclosure is not limited by the embodiments.

The scope of the present disclosure should be construed on the basis of the accompanying claims, and all the technical ideas within the scope equivalent to the claims should be included in the scope of the present disclosure.

The invention claimed is:

1. A beverage maker, comprising:
   a base;
   a fermentation module including a fermentation tank module having an opening, and a fermentation lid configured to open/close the opening, and disposed on the base;
   a passage module connected to the fermentation module and including at least one passage and at least one valve;
   a main frame disposed on the base, wherein at least a part of the passage module is mounted on the main frame, wherein the main frame includes:
      a frame body in which the at least a part of the passage module is disposed; and
      a fermentation module contact body provided in the frame body and making contact with the fermentation module; and
   a water tank configured to store water supplied to the fermentation module and spaced apart from the fermentation module, wherein the main frame further includes:
      a water tank supporter configured to support the water tank such that the water tank is spaced apart from the base.

2. The beverage maker of claim 1, wherein the passage module includes:
   a water supplying passage module configured to supply water;
   a main passage that connects the water supplying passage module with the fermentation module; and
   a main valve installed in the main passage, and wherein the main valve is mounted on the main frame.

3. The beverage maker of claim 2, further comprising:
   a dispenser connected to the main passage and configured to accommodate materials for beverage making, wherein the main passage includes:

a first main passage located before the dispenser in a flow direction of water and connected to the water supplying passage module;

a second main passage located after the dispenser in the flow direction of the water, wherein the main valve is installed in the second main passage; and a bypass passage that connects the first main passage and the second main passage and allows bypass of the materials for beverage making accommodated in the dispenser.

4. The beverage maker of claim 3, wherein the passage module further includes:

a bypass valve configured to open/close the bypass passage and installed in the main frame.

5. The beverage maker of claim 3, wherein the dispenser is located above the main frame.

6. The beverage maker of claim 3, wherein the passage module includes:

at least one dispenser inlet passage that connects the first main passage to the dispenser; and at least one opening/closing valve to open/close the at least one dispenser inlet passage, and wherein the at least one opening/closing valve is mounted on the main frame.

7. The beverage maker of claim 1, further comprising:

an air injection pump configured to inject air into the fermentation module; and a beverage making pack inserted into the fermentation module through the opening and accommodated into the fermentation module, wherein the passage module includes:

an air supplying passage configured to guide air, which is pumped from the air injection pump, to a space between the beverage making pack and the fermentation tank module; and an air supplying opening/closing valve to open/close the air supplying passage, and wherein the air supplying opening/closing valve is mounted on the main frame.

8. The beverage maker of claim 7, wherein the passage module further includes:

an air discharging passage connected to the air supplying passage; and an air discharging valve configured to open/close the air discharging passage, and wherein the air discharging valve is mounted on the main frame.

9. The beverage maker of claim 1, wherein the water tank supporter includes:

a support plate spaced apart upward from the base, and the water tank is placed on the support plate; and a reinforcement wall that extends downward from the support plate.

10. The beverage maker of claim 9, further comprising:

an air injection pump configured to inject air into the fermentation module, wherein an air injection pump mounting part, in which the air injection pump is mounted, is formed on the support plate.

11. The beverage maker of claim 1, wherein a front surface of the frame body includes:

a first curved surface that faces an outer circumference of the fermentation module; and a second curved surface that is spaced apart from the first curved surface and faces the water tank in a frontward-rearward direction.

\* \* \* \* \*